United States Patent
Shinohara et al.

(10) Patent No.: US 9,164,215 B2
(45) Date of Patent: Oct. 20, 2015

(54) LIGHT GUIDE PLATE AND SURFACE LIGHT SOURCE DEVICE

(71) Applicant: OMRON Corporation, Kyoto-shi, Kyoto (JP)

(72) Inventors: Masayuki Shinohara, Nagaokakyou (JP); Kazuhide Hirota, Moriyama (JP); Norikazu Kitamura, Kusatsu (JP); Takako Ishikawa, Kobe (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 14/138,890

(22) Filed: Dec. 23, 2013

(65) Prior Publication Data

US 2014/0176873 A1    Jun. 26, 2014

(30) Foreign Application Priority Data

Dec. 26, 2012 (JP) .................. 2012-283538
Oct. 31, 2013 (JP) .................. 2013-227420

(51) Int. Cl.
*G02F 1/1335* (2006.01)
*F21V 8/00* (2006.01)

(52) U.S. Cl.
CPC .............. *G02B 6/0016* (2013.01); *G02B 6/002* (2013.01); *G02B 6/0018* (2013.01); *G02B 6/0038* (2013.01)

(58) Field of Classification Search
CPC ............ G02F 1/133615; G02B 6/0038; G02B 6/0028; G02B 6/0045; G02B 6/0046; G02B 6/0048
USPC ...................................... 349/65; 362/615, 628
See application file for complete search history.

(56) References Cited

U.S. PATENT DOCUMENTS

| 8,517,591 B2 * | 8/2013 | Nakamoto et al. ............ 362/621 |
| 2007/0177486 A1 | 8/2007 | Naoi |
| 2007/0274100 A1 * | 11/2007 | Yang et al. .................... 362/615 |

FOREIGN PATENT DOCUMENTS

JP    2008-016432 A    1/2008

* cited by examiner

*Primary Examiner* — Thanh-Nhan P Nguyen
(74) *Attorney, Agent, or Firm* — Osha Liang LLP

(57) ABSTRACT

A light guide plate has a light introduction part having an end face configured to have light incident thereon, and a light guide plate body provided continuously to the light introduction part and comprising a thickness smaller than maximum thickness of the light introduction part. The light guide plate body has a light emitting surface configured to emit light incident from the end face. A directivity conversion pattern is provided on at least one of a face on a light exit side and a face opposite to the face. The directivity conversion pattern converts directivity spread in a thickness direction of the light introduction part to a directivity characteristic which is inclined in a direction parallel to a face direction of the light introduction part. A light reflection wall is provided on the end face.

14 Claims, 22 Drawing Sheets

LIGHT GUIDE PLATE AND SURFACE LIGHT SOURCE DEVICE

CROSS REFERENCE TO RELATED APPLICATIONS

This application claims priority to Japanese Patent. Application. No. 2012-283538 filed on Dec. 26, 2012, and Japanese Patent Application No. 2013-227420 filed on Oct. 31, 2013, the entire contents of which are incorporated by reference herein.

BACKGROUND

1. Field

The present invention relates to a light guide plate and a surface light source device.

2. Related Art

In recent years, as the thickness of a mobile device decreases, a surface light source device which is assembled in a mobile device is also requested to become thinner and thinner. To reduce the thickness of the surface light source device, the thickness of the light guide plate has to be decreased. However, even when the thickness of a light guide plate having a flat plate shape is reduced, it is difficult to reduce the height of an LED light source. In the case of using a thin light guide plate having a flat plate shape, the height of the light source becomes larger than the thickness of an end face (light incident end face) of the light guide plate. As a result, a light source disposed so as to be opposed to the light incident end face of the light guide plate is protruded above the top face of the light guide plate. In the case where the light source is protruded above the top face of the light guide plate, all of light emitted from the light source does not enter the light incident end face of the light guide plate but a part of the light leaks to the outside of the light guide plate, so that the light use efficiency deteriorates.

An example of a light guide plate is given as follows. The light guide plate has a light introduction part thicker than a light guide plate body at an end of the light guide plate body having a flat plate shape. In the top face of the light introduction part, an inclined face which is inclined from a part where the thickness is largest in the light introduction part toward the end of the light guide plate body is formed. Since the thickness of the end face (light incident end face) of the light introduction part is equal to or larger than the height of a light source, the light guide plate can efficiently take the light of the light source into the light introduction part and guide the light to the thinner light guide plate body.

The light which enters the light introduction part from the light incident end face is transmitted to the light guide plate body while being totally reflected between the inclined face and the lower face of the light introduction part. The incidence angle of the light propagating in the light guide plate body when the light is incident on the upper face of the light guide plate body becomes smaller each time the light is totally reflected by the inclined face. Due to this, the light easily leaks from the top face of the light guide plate body positioned in the proximity of the inclined face to the outside of the light guide plate body. In particular, when the inclination angle of the inclined face increases, the leakage of light from the top face of the light guide plate body in the proximity of the inclined face becomes conspicuous.

To reduce the light leakage, a surface light source device as illustrated in FIG. 1A is used. A surface light source device 11 illustrated in FIG. 1A is made of a light source 12 and a light guide plate 13. The light guide plate 13 is obtained by integrally forming a light introduction part 14 having a wedge shape and a light guide plate body 15 having a flat plate shape. The top face of the light introduction part 14 is an inclined face 16 which is inclined from the top face of the upper end of the light introduction part 14 to the end of the light guide plate body 15. The inclined face 16 of the light introduction part 14 has a directivity conversion pattern 17 in which a plurality of V grooves 18 are arranged in the width direction of the light guide plate 13. The top face (light emitting surface 20) of the light guide plate body 15 has a lenticular lens 21. The light source 12 is opposed to the end face (light incident end face 19) of the light introduction part 14.

Light emitted from the light source 12 enters from the light incident end face 19 to the inside of the light introduction part 14 and is guided in the light introduction part 14. Since the light incident on the inclined face 16 in the light introduction part 14 is reflected by the V groove 18 and travels to the lateral direction (width direction of the light introduction part 14), the light incidence angle when the light is incident on the light guide plate body 15 in the proximity of the inclined face 16 becomes large. As a result, light leakage from the top face of the light guide plate body 15 in the proximity of the inclined face 16 is suppressed.

The surface light source device 11 is illustrated in FIG. 1B. Light L introduced in the light introduction part 14 is reflected in the lateral direction each time the light L is incident on the V grooves 18, a part of the light L is gradually guided to a side face of the light guide plate 13. The light L reached the side face of the light guide plate 13 leaks to the outside from the side face of the light guide plate 13 without reaching the light emitting surface 20. The phenomenon causes a light amount loss in the surface light source device 11 and deteriorates the light use efficiency of the surface light source device 11.

There is a case that a plurality of the surface light source devices 11 illustrated in FIG. 1A are arranged continuously along the width direction. In other words, it is a case where a plurality of light sources are arranged at a predetermined pitch so as to be opposed to the light incident end faces in a light guide plate wider than the light guide plate 13 illustrated in FIG. 1A. In this case, light L leaks from a border face of the light guide plates 13 (the position corresponding to the side face of the light guide plate 13 in FIG. 1A) to the adjacent light guide plate 13, and brightness unevenness may occur in both of the light guide plates 13.

A surface light source device 31 is illustrated in FIG. 2. In the surface light source device 31, both side faces of the light guide plate 13 are obliquely cut in the proximity of the light incident end face 19. The obliquely cut faces serve as light reflection walls 32. The light guide plate of this type is described in, for example, JP 2008-16432 Å.

In the surface light source device 31, as illustrated in FIG. 3A, the light L which reaches the side face of the light guide plate 13 while being repeatedly reflected by the upper face (V grooves 18) of the light introduction part 14 and the lower face is totally reflected by the light reflection wall 32 and returns to the center part of the light guide plate 13. As a result, light leakage in the side faces of the light guide plate 13 is reduced, and light use efficiency improves. Also in the case where a plurality of surface light source devices 31 are disposed continuously in the width direction, leakage of the light L to the adjacent light guide plate 13 is suppressed, and occurrence of brightness unevenness is suppressed.

In the surface light source device 31 of FIG. 2, light incident on the light reflection wall 32 has to be totally reflected as many as possible by the light reflection wall 32. Consequently, the light reflection wall 32 has optimum length and optimum inclination angle (angle formed by the light reflection wall 32 and a direction perpendicular to the light incident end face 19 when viewed from a direction perpendicular to the light emitting surface 20), and the adjustment range of the inclination angle of the light reflection wall 32 is narrow. Since the inclination adjustment range of the light reflection wall 32 is narrow, when a width W of the light guide plate 13 decreases, a width D of the light incident end face 19 also decreases as illustrated in FIG. 3B. As a result, there is the case where the width D of the light incident end face 19 becomes smaller than a width "d" of (the light exit window of) the light source 12. In the case where the surface light source devices 31 are continuously disposed along the width direction, when the arrangement pitch of the light sources 12 becomes narrow, the width W of the light guide plate 13 corresponding to one light source is accordingly reduced. As a result, there is the case where the width D of the light incident end face 19 becomes smaller than the width "d" of the light source 12. When the width D of the light incident end face 19 becomes smaller than the width "d" of the light source 12, a part of light emitted from the light source 12 goes out from both sides of the light incident end face 19 and does not enter the light guide plate 13, causing light use efficiency to deteriorate.

SUMMARY

One or more embodiments of the present invention provides a light guide plate in which a light reflection wall is provided on a light incident end face, in which the light incident end face is not easily narrowed even when a width of the light guide plate decreases or the arrangement pitch of a plurality of light sources disposed so as to face light incident end faces is narrowed. One or more embodiments of the present invention provides a surface light source device using the light guide plate.

A first light guide plate according to one or more embodiments of the present invention includes: a light introduction part including an end face on which light is incident; and a light guide plate body provided continuously to the light introduction part and including a thickness smaller than maximum thickness of the light introduction part, wherein: the light guide plate body includes a light emitting surface emitting the light incident from the end face; a directivity conversion pattern is provided on at least one of a face on a light exit side and a face opposite to the face and converts directivity spread in a thickness direction of the light introduction part to a directivity characteristic which is inclined in a direction parallel to a face direction of the light introduction part; and a light reflection wall is provided on the end face, the light reflection wall having, when viewed from a direction perpendicular to the light emitting surface, an angle formed by a region close to the end face and a direction perpendicular to the end face being smaller than an angle formed by a region far from the end face and the direction perpendicular to the end face. The light reflection wall may partly have a part parallel to a direction perpendicular to the end face.

The first light guide plate according to one or more embodiments of the present invention has a directivity conversion pattern which is provided on at least one of a face on a light exit side and a face opposite to the face. In the light guide plate in which the light reflection wall is provided on the end face on which light is incident, when the light reflection wall is viewed from a direction perpendicular to the light emitting surface, the angle formed by region close to the end face and the direction perpendicular to the end face is smaller than the angle formed by the region far from the end face and the direction perpendicular to the end face. As a result, when viewed from the direction perpendicular to the light emitting surface, the ratio of the width of the light reflection wall at an end on the side of the end face to the width of the light reflection wall in a region far from the end face can be made higher than that in the case where the angle of the entire light reflection wall is constant. Therefore, in the first light guide plate of one or more embodiments of the present invention, even in the case where the width of the light guide plate decreases or the arrangement pitch of a plurality of light sources disposed so as to face the light incident end faces is narrowed, a width of the end face (light incident end face) of the light guide plate does not easily become smaller than the width of the light source, and decrease in the amount of light source light taken into the light guide plate can be suppressed.

Therefore, a first light guide plate according to one or more embodiments of the present invention, when viewed from a direction perpendicular to the light emitting surface, the width of the light reflection wall at an end on the side of the end face is smaller than the width of the light reflection wall at an end on the side opposite to the end face.

In a first light guide plate according to one or more embodiments of the present invention, when viewed from a direction perpendicular to the light emitting surface, the angle formed by the light reflection wall and a direction perpendicular to the end face increases as the light reflection wall is far from the end face. In one or more embodiments of the present invention, even in the case where the width of the light guide plate decreases or the arrangement pitch of a plurality of light sources disposed so as to face the light incident end faces is narrowed, the width of the end face (light incident end face) of the light guide plate does not easily become smaller than the width of the light source, and decrease in the amount of light source light taken into the light guide plate can be suppressed.

In a first light guide plate according to one or more embodiments of the present invention, the light reflection wall is constructed by a plurality of flat faces or a curved face.

In a first light guide plate according to one or more embodiments of the present invention, the light introduction part may have, on at least one of a face on the light exit side and a face opposite to the face, an inclined face which is inclined from a surface of a part thicker than the light guide plate body toward an end of the light guide plate body. By providing the light introduction part with such an inclined face, the height of the end face on which light is incident can be increased, and leakage of light in the light introduction part can be decreased.

In a first light guide plate according to one or more embodiments of the present invention, when viewed from a direction perpendicular to the light emitting surface, the entire light reflection wall is inclined with respect to a direction perpendicular to the end face. According to one or more embodiments of the present invention, the leakage of light can be reduced in the entire light reflection wall.

A second light guide plate according to one or more embodiments of the present invention includes: a light introduction part including an end face on which light is incident; and a light guide plate body provided continuously to the light introduction part and including a thickness smaller than maximum thickness of the light introduction part, wherein: the light guide plate body includes a light emitting surface emitting the light incident from the end face; a directivity conversion pattern is provided on at least one of a face on a light exit side and a face opposite to the face, and converts directivity spread in a thickness direction of the light introduction part to a directivity characteristic which is inclined in a direction parallel to a face direction of the light introduction part; and a light reflection wall is provided on the end face;

and the light reflection wall having, when viewed from a direction perpendicular to the light emitting surface, at least a part of regions being inclined with respect to a direction perpendicular to the end face, and a normal which is set for a surface of the light reflection wall being inclined from the direction parallel to the light emitting surface.

The second light guide plate of one or more embodiments of the present invention has a directivity conversion pattern which is provided on at least one of a face on a light exit side of the light guide plate and a face opposite to the face. An end face (light incident end face) of the light guide plate is provided with the light reflection wall in which at least a region of a part is inclined with respect to the direction perpendicular to the end face when viewed from a direction perpendicular to the light emitting surface. As a result, light which reaches the light reflection wall can be reflected and returned to the inside of the light guide plate, and leakage of light in the side faces of the light guide plate can be reduced. Further, in the second light guide plate of one or more embodiments of the present invention, the normal which is set to the surface of the light reflection wall is inclined from the direction parallel to the light emitting surface, so that the directivity characteristic of light guided in the light guide plate can be narrowed in the thickness direction of the light guide plate, and leakage of light can be reduced.

In a second light guide plate according to one or more embodiments of the present invention, when the light reflection wall is viewed from a direction perpendicular to the light emitting surface, an angle formed by a region close to the end face and a direction perpendicular to the end face is smaller than an angle formed by a region far from the end face and the direction perpendicular to the end face. In one or more embodiments, when viewed from the direction perpendicular to the light emitting surface, the ratio of the width of the light reflection wall at an end on the side of the end face to the width of the light reflection wall at an end on the side far from the end face can be made higher than that in the case where the angle of the light reflection wall is constant. As a result, even in the case where the width of the light guide plate decreases or the arrangement pitch of a plurality of light sources disposed so as to face the light incident end faces is narrowed, the width of the end face (light incident end face) of the light guide plate does not easily become smaller than the width of the light source, and decrease in the amount of light source light taken into the light guide plate can be suppressed.

In a second light guide plate according to one or more embodiments of the present invention, the light introduction part may have, on at least one of a face on the light exit side and a face opposite to the face, an inclined face which is inclined from a surface of a part thicker than the light guide plate body toward an end of the light guide plate body. By providing the light introduction part with such an inclined face, the height of the end face on which light is incident can be increased, and leakage of light in the light introduction part can be decreased.

A surface light source device according to one or more embodiments of the present invention is characterized by including the first or second light guide plate according to one or more embodiments of the invention and a light source configured to transmit light to the end face of the light guide plate. Since the surface light source device according to one or more embodiments of the present invention uses the light guide plate of one or more embodiments of the invention, even in the case where the width of the light guide plate decreases or the arrangement pitch of a plurality of light sources disposed so as to face the light incident end faces is narrowed, the width of the end face (light incident end face) of the light guide plate does not easily become smaller than the width of the light source. As a result, decrease in the amount of light source light taken into the light guide plate can be suppressed, and the light use efficiency of the surface light source device can be improved.

The first or second light guide plate according to one or more embodiments of the present invention can be used for a liquid crystal display device, and a liquid crystal display device having high light use efficiency can be fabricated.

The liquid crystal display device according to one or more embodiments of the present invention can be used for a mobile device such as a smartphone, a tablet computer, an electronic book reader, or an electronic dictionary.

Embodiments of the present invention are not limited to the above. Additionally, embodiments of the present invention may be formed by combining any of the above elements.

DETAILED DESCRIPTION

Hereinafter, embodiments of the present invention will be described with reference to the appended drawings. The present invention, however, is not limited to the following embodiments but can be variously changed without departing from the gist of the invention. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

Figure 1A:
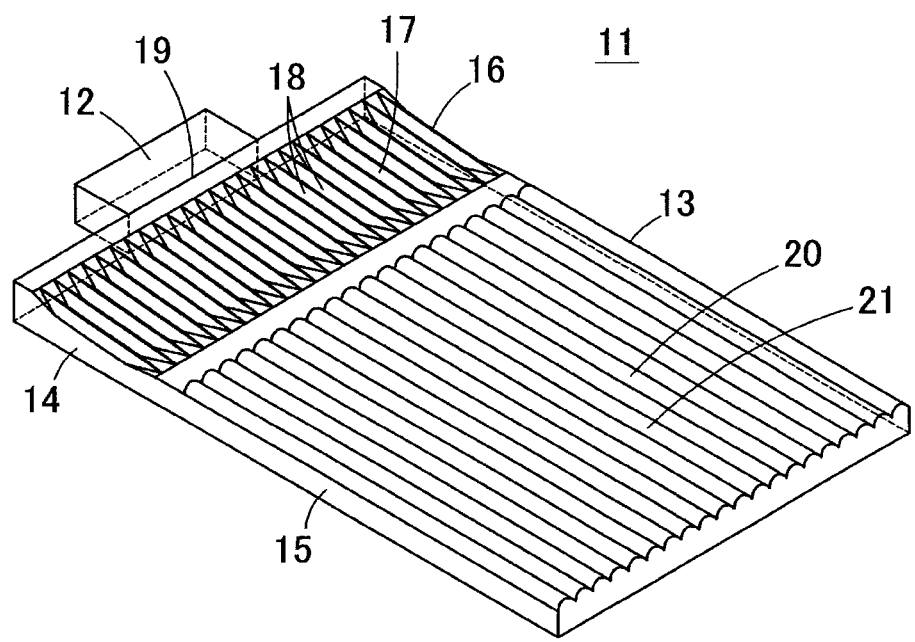
FIG. 1A is a perspective view of a conventional surface light source device.
Figure 1B:
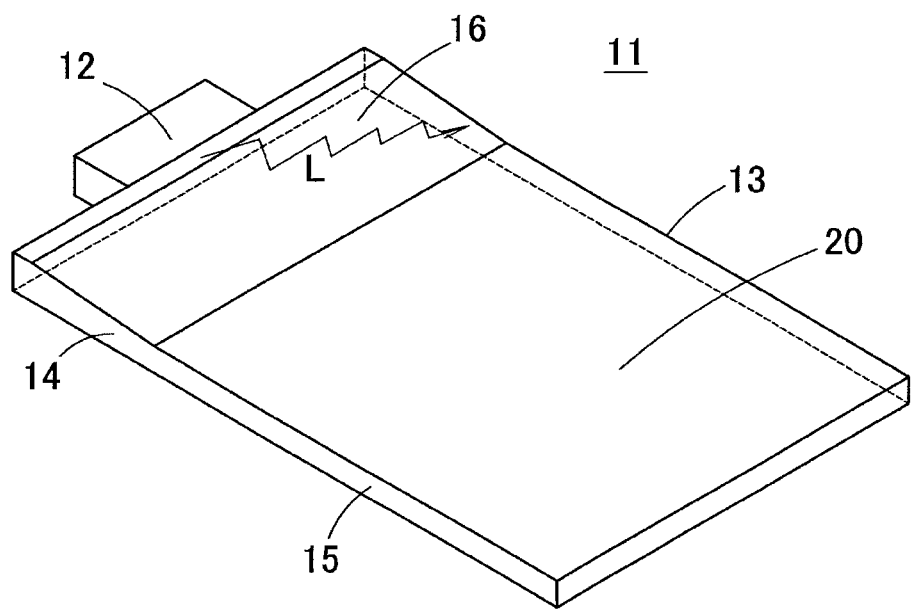
FIG. 1B is a schematic perspective view for explaining the behavior of light in a light guide plate in FIG. 1A.
Figure 2:
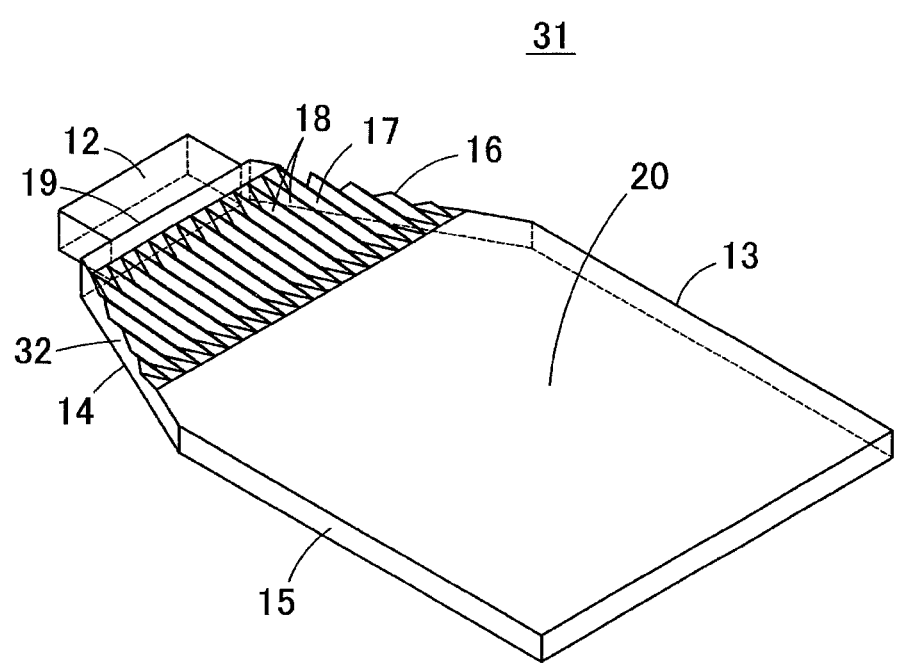
FIG. 2 is a perspective view illustrating another conventional surface light source device.
Figure 3A:
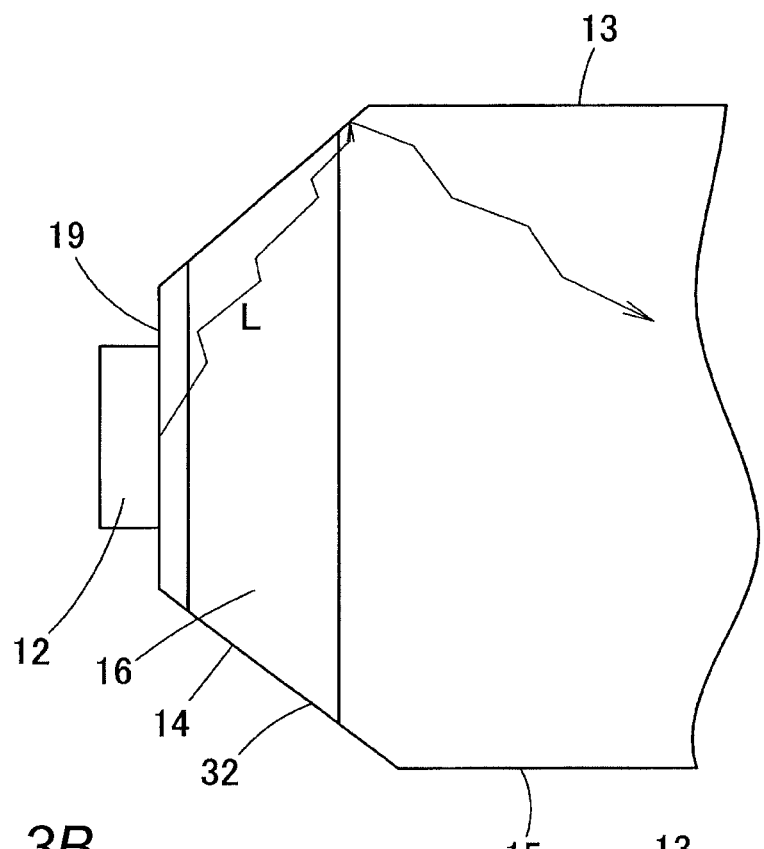
FIG. 3A is a schematic plan view for explaining the behavior of light in the surface light source device in FIG. 2.
Figure 3B:
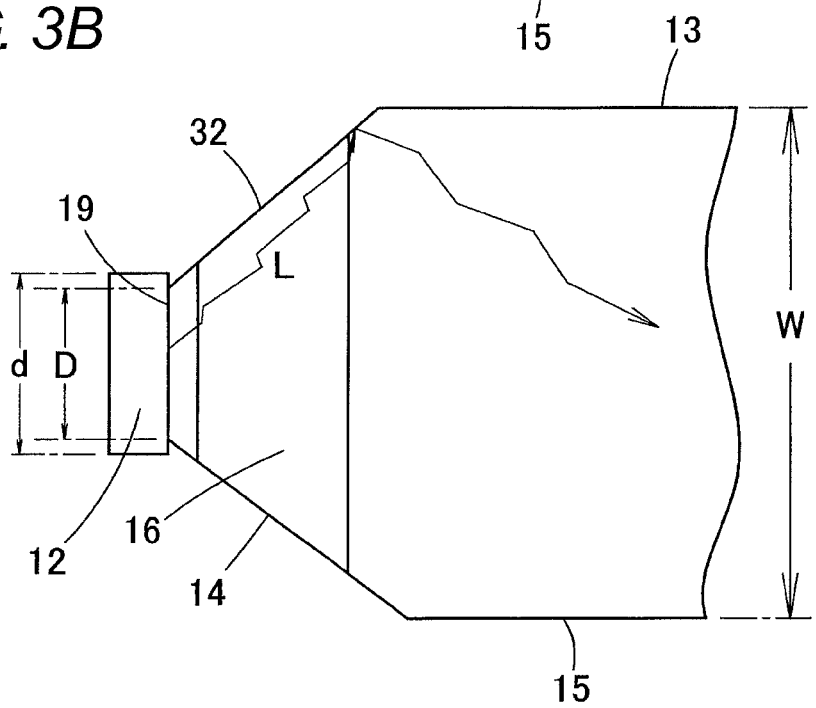
FIG. 3B is a diagram illustrating inconvenience in the case where the width of the light guide plate becomes narrower in the surface light source device of FIG. 2.
Figure 4:
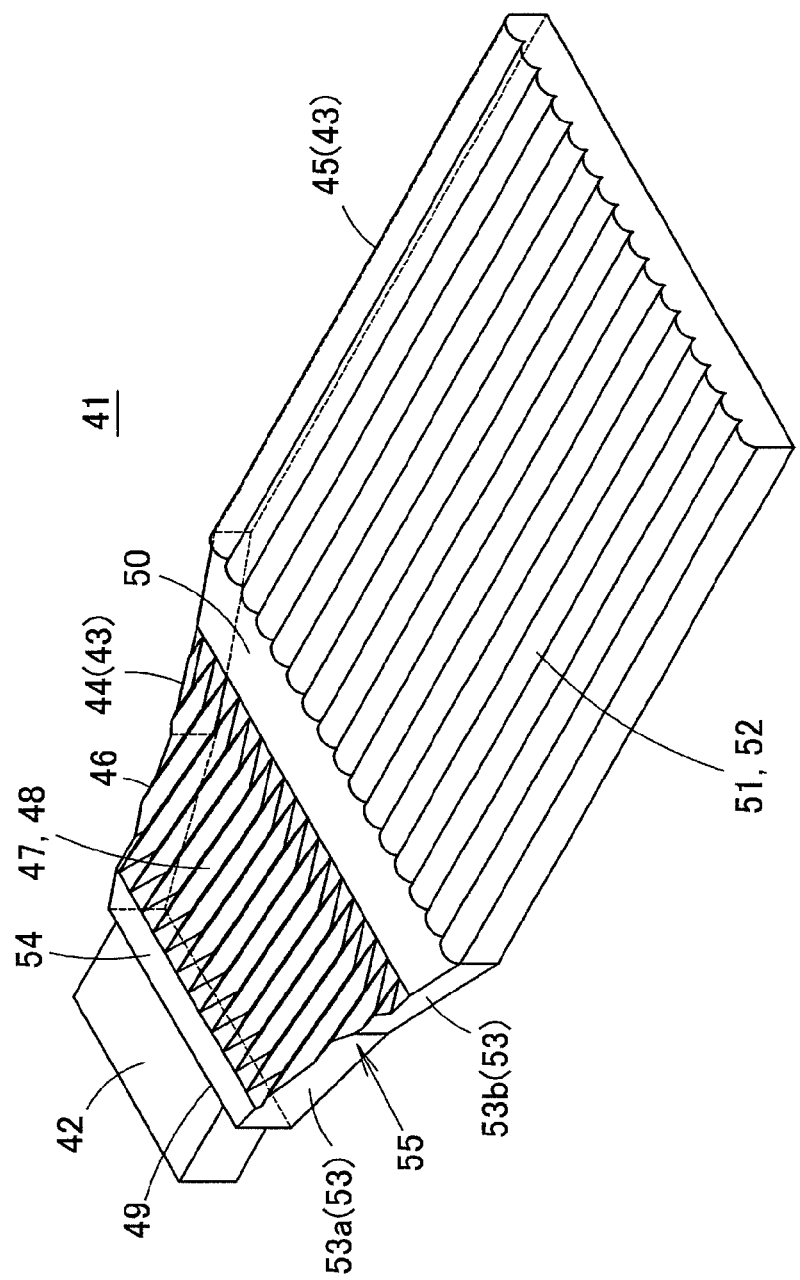
FIG. 4 is a perspective view illustrating a surface light source device according to a first embodiment of the present invention.
Figure 5A:
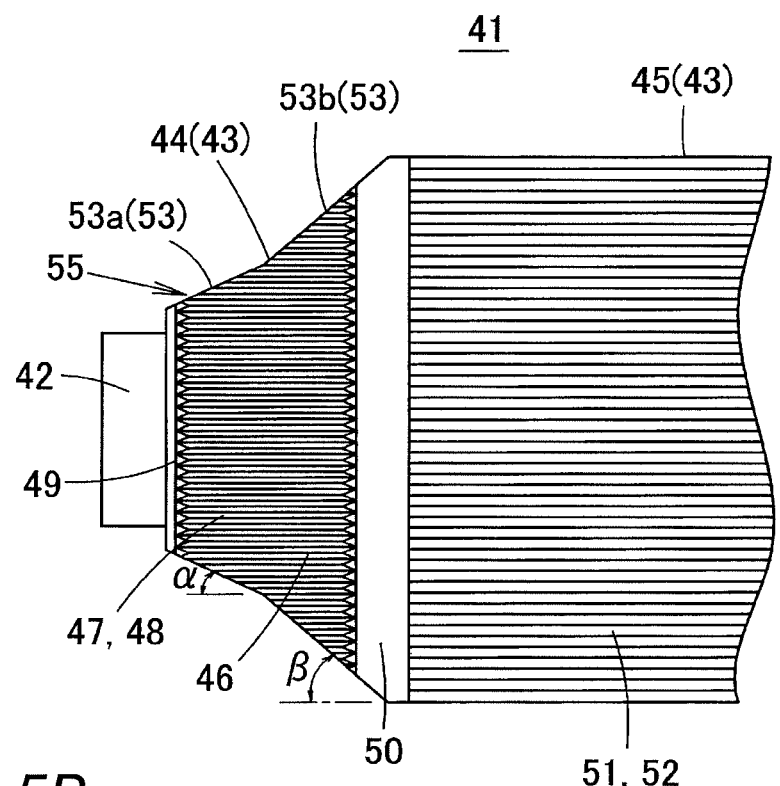
FIG. 5A is a partly-broken plan view of the surface light source device illustrated in FIG. 4.
Figure 5B:
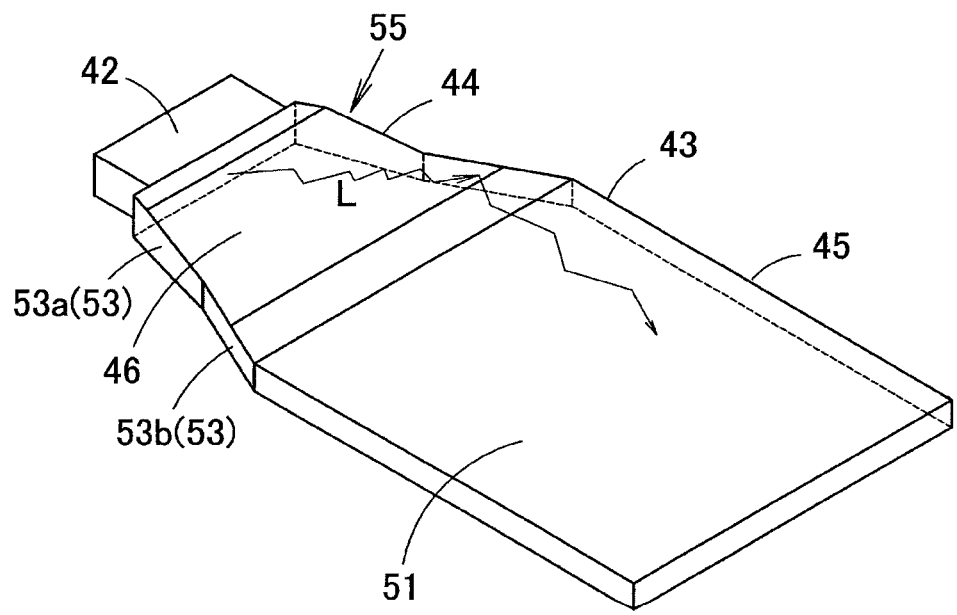
FIG. 5B is a schematic perspective view for explaining the behavior of light in the surface light source device illustrated in FIG. 4.

Hereinafter, with reference to FIG. 4 and FIGS. 5A and 5B, a surface light source device according to a first embodiment of the present invention will be described. FIG. 4 is a perspective view illustrating a surface light source device 41 according to the first embodiment of the present invention. FIG. 5A is a partly-broken plan view of the surface light source device 41. FIG. 5B is a schematic perspective view illustrating the behavior of light in the light guide plate of the surface light source device 41.

The surface light source device 41 is made by a light source 42 and a light guide plate 43. The light source 42 has therein one or plural LEDs and emits white light from a light exit window in the front face. The light source 42 is also called a point light source.

The light guide plate 43 is obtained by integrally forming a light introduction part 44 at an end of a light guide plate body 45. The light guide plate 43 is formed by a transparent resin having high refractive index such as acrylic resin, polycarbonate resin (PC), cycloolefin-based material, or polymethyl methacrylate (PMMA).

The light introduction part 44 is a thick part in the light guide plate 43. The light source 42 faces the end face of the light introduction part 44, that is, a light incident end face 49. The thickness of the light incident end face 49 is equal to or larger than the height of a light exit window of the light source 42. The width of the light incident end face 49 is also equal to or larger than the width of the light emitting surface of the light source 42. As a result, light emitted from the light source 42 efficiently enters the light introduction part 44 from the light incident end face 49, and light use efficiency of the surface light source device 41 improves.

The light introduction part 44 has a wedge shape and becomes gradually thinner from the light incident end face side toward the light guide plate body side. That is, in the top face of the light introduction part 44, the end-part region on the side of the light incident end face is a horizontal face 54, and a region from the end of the horizontal face 54 to the end of the light guide plate body 45 is an inclined face 46. The inclined face 46 extends in a band shape from one side face of the light guide plate 43 to the other side face and is inclined downward from the end of the horizontal face 54 toward the end of the light guide plate body 45.

The inclined face 46 has a directivity conversion pattern 47. The directivity conversion pattern 47 is made by a plurality of pattern elements 48 having a V-groove shape. When viewed from a direction perpendicular to the light emitting surface 51, the pattern elements 48 extend in a direction perpendicular to the light incident end face 49. The pattern elements 48 are arranged in parallel to one another along the width direction of the inclined face 46.

The light guide plate body 45 is a flat plate whose surface and rear face are parallel. The thickness of the light guide plate body 45 is almost uniform and is smaller than the maximum thickness of the light introduction part 44. The light guide plate body 45 occupies the area of a major part of the light guide plate 43. The opposite face opposed to a light emitting surface 51, of the light guide plate body 45 has light exit means 72 (refer to FIG. 16A) such as a prism-shaped pattern, a sandblast process, diffusion ink, or a diffraction grating pattern.

In the top face of the light guide plate body 45, a narrow part adjacent to the light introduction part 44 is a flat face 50, and the part other than the flat face 50 is the light emitting surface 51. The light emitting surface 51 has a plurality of lenticular lenses 52. The lenticular lenses 52 have the function of narrowing the directivity characteristic of light which goes out from the light emitting surface 51 in the width direction of the light guide plate body 45. The lenticular lenses 52 extend in a direction perpendicular to the light incident end face 49

(hereinbelow, called optical axis direction) and are arranged parallel to one another along the width direction of the light emitting surface 51.

The light guide plate 43 has a light reflection wall 53 between the light incident end face 49 and the light guide plate 43. A region adjacent to the light incident end face 49, of the light guide plate 43, that is, the region between the right and left light reflection walls 53 is a tapered part 55 having a tapered shape when viewed from above. As illustrated in FIG. 5A, when viewed from above, the light reflection wall 53 is entirely or partly inclined to the optical axis direction. The width of the tapered part 55 (the width of the light incident end face 49) at the end on the light incident end face side is smaller than the width of the tapered part 55 at the end on the side farthest from the light incident end face 49. In the illustrated example, each of the light reflection walls 53 is made by two flat faces; a light reflection wall 53a positioned on the light incident end face side and a light reflection wall 53b positioned on the side far from the light incident end face 49. When viewed from above, the inclination angle α formed by the light reflection wall 53a and the optical axis direction is smaller than the inclination angle β formed by the light reflection wall 53b and the optical axis direction. The optical reflection wall 53a may be inclined with respect to the optical axis direction or parallel to the optical axis direction when viewed from above.

In the first embodiment, the light reflection walls 53a and 53b are faces perpendicular to the light emitting surface 51. In other words, normals set to the light reflection walls 53a and 53b are parallel to the light emitting surface 51.

To the under face of the light guide plate 43, a reflection sheet 73 (refer to FIG. 16A) is opposed. The reflection sheet 73 functions to reflect light leaked from the under face of the light guide plate 43 so that the light returns to the inside of the light guide plate 43.

In the surface light source device 41, light emitted from the light source 42 behaves as follows. Light L emitted from the light source 42 enters from the light incident end face 49 to the inside of the light introduction part 44 and, while being reflected by the upper and lower faces of the light introduction part 44, the light L is guided to the light guide plate body 45. As illustrated in FIG. 5B, the travel direction of the light L guided in the light introduction part 44 is bent in the width direction of the light guide plate 43 each time the light L is reflected by the pattern elements 48. Consequently, the light L is bent larger as the light L is far from the light incident end face 49, and a part of the light reaches the light reflection wall 53. The light incident on the light reflection wall 53 is reflected by the light reflection wall 53 which is inclined from the optical axis direction so that the light returns to the center part of the light guide plate 43. Therefore, light leakage in the side faces of the light guide plate 43 can be prevented, and the light use efficiency of the surface light source device 41 improves. The light returned to the center part of the light guide plate 43 is guided while being reflected by the upper and lower faces of the light guide plate body 45. By being reflected by the light exit means 72, the light goes out from the light emitting surface 51 and becomes illumination light.

The light L is reflected many times in the pattern elements 48 and then reaches the light reflection wall 53, so that the light L travels also in the length direction (optical axis direction) of the light guide plate 43 until the light L reaches the light reflection wall 53. Therefore, the light which reaches the light reflection wall 53 is incident on the light reflection wall 53b positioned on the side far from the light incident end face 49 in the reflection wall 53. In consideration of such behavior of light, the inclination angle β of the light reflection wall 53b is set to an inclination angle which is suitable to totally reflect the light L and return the light to the center of the light guide plate 43. On the other hand, the inclination angle α of the light reflection wall 53a close to the light incident end face 49 is smaller than the inclination angle β of the light reflection wall 53b, and it is designed so that the width of the light incident end face 49 does not become narrower than that of the light exit window of the light source 42. As a result, in the surface light source device 41 of the first embodiment, light leakage in the side face of the light guide plate 43 is reduced, the light capture rate of the light source 42 by the light incident end face 49 is improved, and the light use efficiency of the surface light source device 41 can be improved.

When the length in the optical axis direction of the light reflection wall 53b is about the half of the length in the optical axis direction of the directivity conversion pattern 47, light leakage in the side face of the light guide plate 43 can be reduced.

Figure 6:
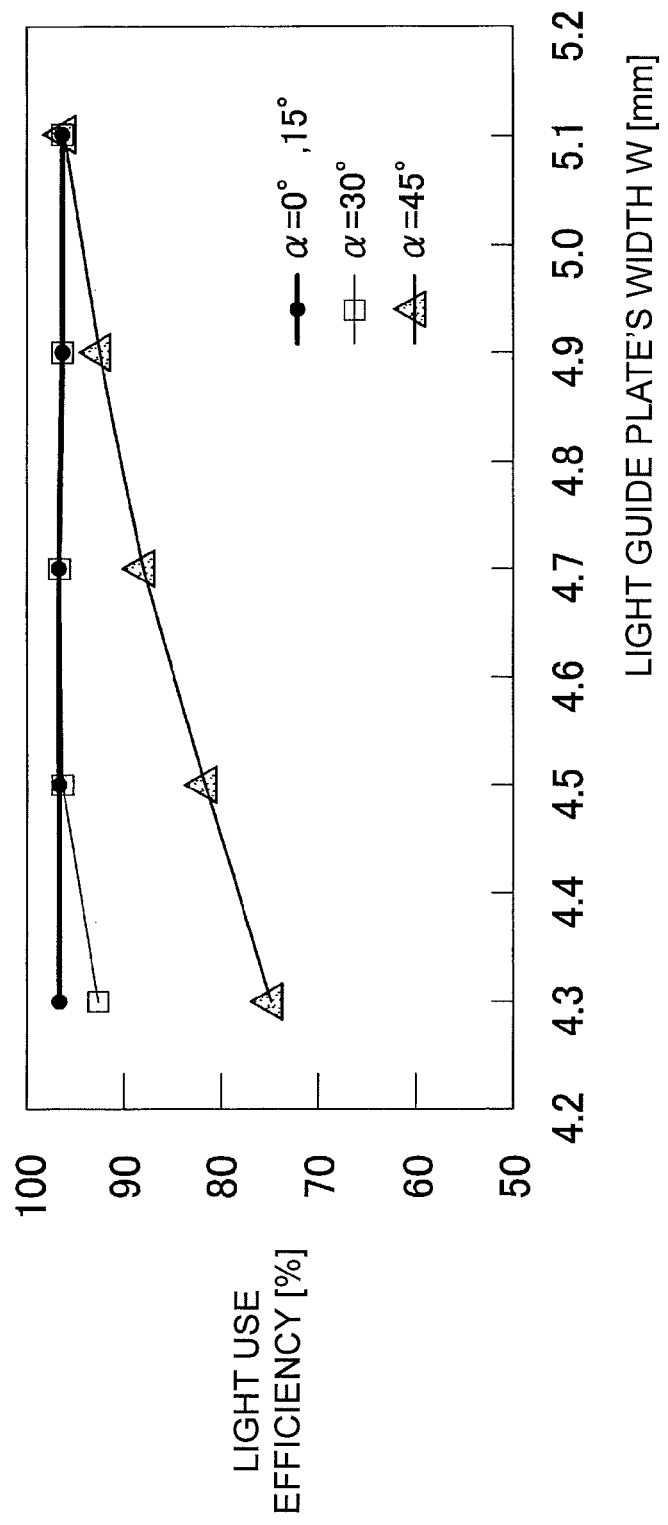
FIG. 6 is a diagram illustrating a result of obtaining a relation between light use efficiency and the width of the light guide plate by simulation using samples having different inclination angles α of the light reflection wall close to the light incident end face.
Figure 7:
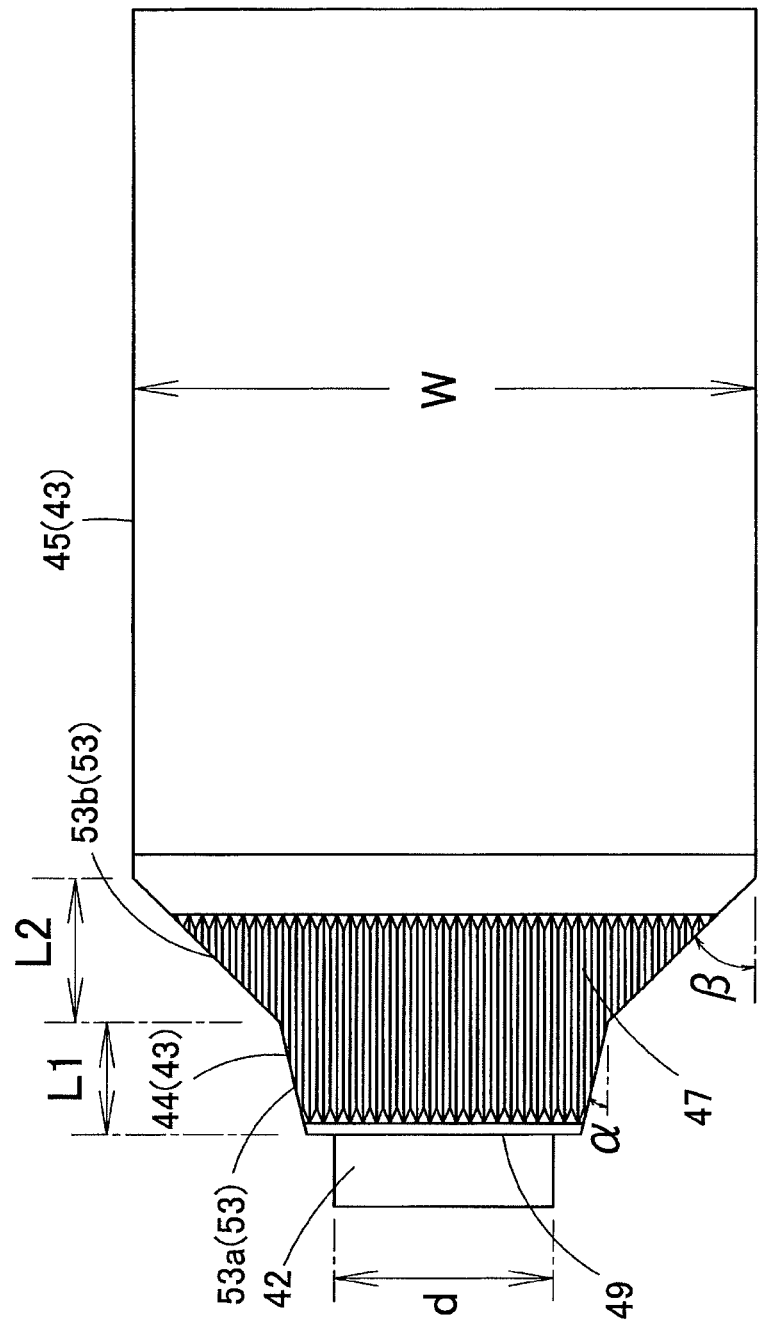
FIG. 7 is a diagram defining dimensions of parts in a sample used for the simulation of FIG. 6.

Next, a result of simulation performed to verify the effect of the first embodiment will be described. FIG. 6 illustrates a result of obtaining a relation between light use efficiency and the width W of the light guide plate by simulation using samples having different inclination angles α of the light reflection wall 53a close to the light incident end face 49. FIG. 7 is a diagram defining dimensions of parts in the samples. For the simulation, four kinds of samples whose inclination angles α of the light reflection wall 53a are 0°, 15°, 30°, and 45° were used. The samples have common things with respect to the points that the length L1 of the light reflection wall 53a is 0.75 mm, the length L2 of the light reflection wall 53b is 0.80 mm, the inclination angle β of the light reflection wall 53b is 45°, and the width "d" of the light exit window of the light source 42 is 2.0 mm. In the sample whose inclination angle α is 45°, α=β like in the conventional technique. While changing the width W of the light guide plate like 4.3 mm, 4.5 mm, 4.7 mm, 4.9 mm, and 5.1 mm in each sample, the light use efficiency was obtained. The light use efficiency indicated in the vertical axis of FIG. 6 denotes the percentage of amount of light which reaches the light guide plate body 45 in the amount of all of light emitted from the light source 42.

In FIG. 6, in a sample (conventional technique) of α=45°, when the width W of the light guide plate decreases, the light use efficiency sharply drops. The reason is that, in the sample of α=45°, when the width W of the light guide plate decreases, the width of the light incident end face 49 immediately becomes smaller than the width "d" of the light source 42. On the other hand, in the samples of α=30°, 15°, and 0°, even when the light guide plate becomes narrower, decrease in the light use efficiency is small as compared with that in the conventional sample (a curve indicating changes in the light use efficiency in the case of α=0° and a curve indicating changes in the light use efficiency in the case of α=15° overlap with each other). In particular, the smaller the inclination angle α is, the smaller the decrease in the light use efficiency is. In the range of the values of the width W in FIG. 6, in the samples whose inclination angle α is 15° or less, decrease in the light use efficiency is hardly seen.

Figures 8A, 8B:
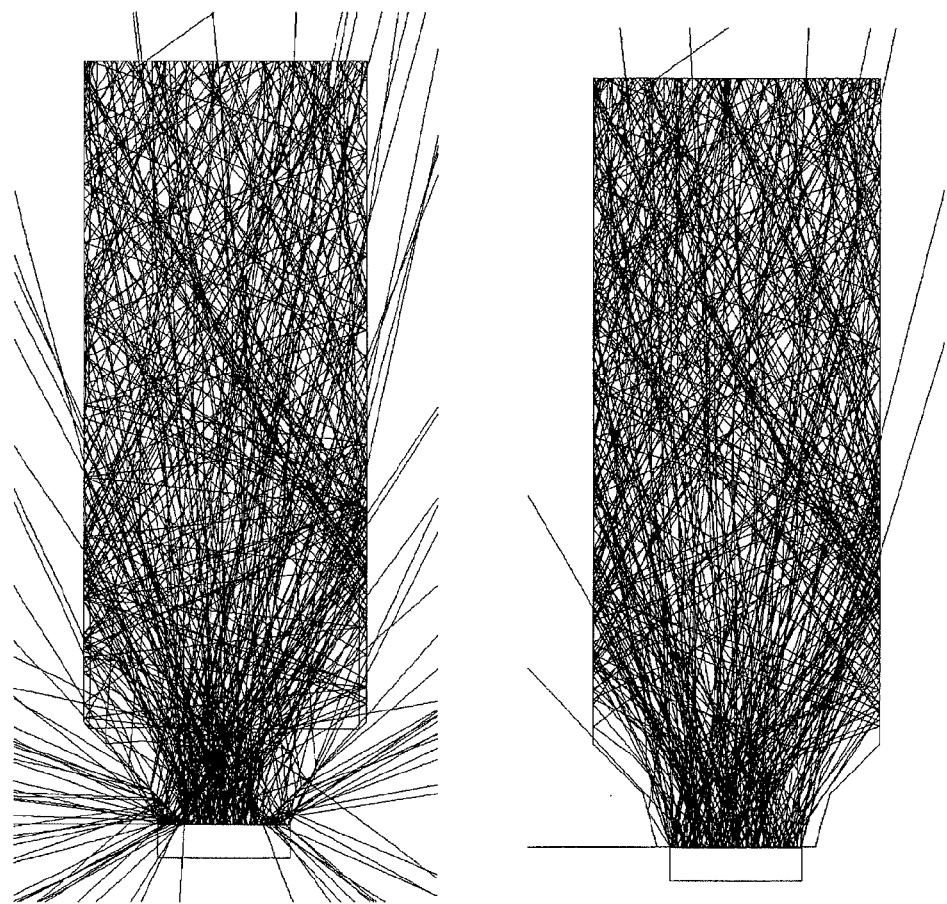
FIG. 8A is a light ray diagram illustrating travel trajectories of light emitted from a light source obtained by simulation in the case where inclination angles α and β are equal to each other.
FIG. 8B is a light ray diagram illustrating travel trajectories of light emitted from a light source obtained by simulation in the case where the inclination angle α is smaller than the inclination angle β.

FIG. 8A is a light ray diagram illustrating travel trajectories of light emitted from the light source obtained by simulation in the case where the inclination angles α and β are equal to each other (α=β=45°). In this case, it is understood that most of light emitted from the light source does not enter the light guide plate but leaks to the outside of the light guide plate. On the other hand, FIG. 8B is a light ray diagram illustrating travel trajectories of light emitted from the light source obtained by simulation in the case where the inclination angle α is smaller than the inclination angle β (α<β=45°). In this case, most of light emitted from the light source enters the light guide plate and leakage from the light guide plate is small.

Although the light reflection wall 53 is constructed by the two faces of light reflection walls 53a and 53b having different inclination angles in the first embodiment, the light reflection wall 53 may be constructed by three or more light reflection walls having different inclination angles.

Figure 9:
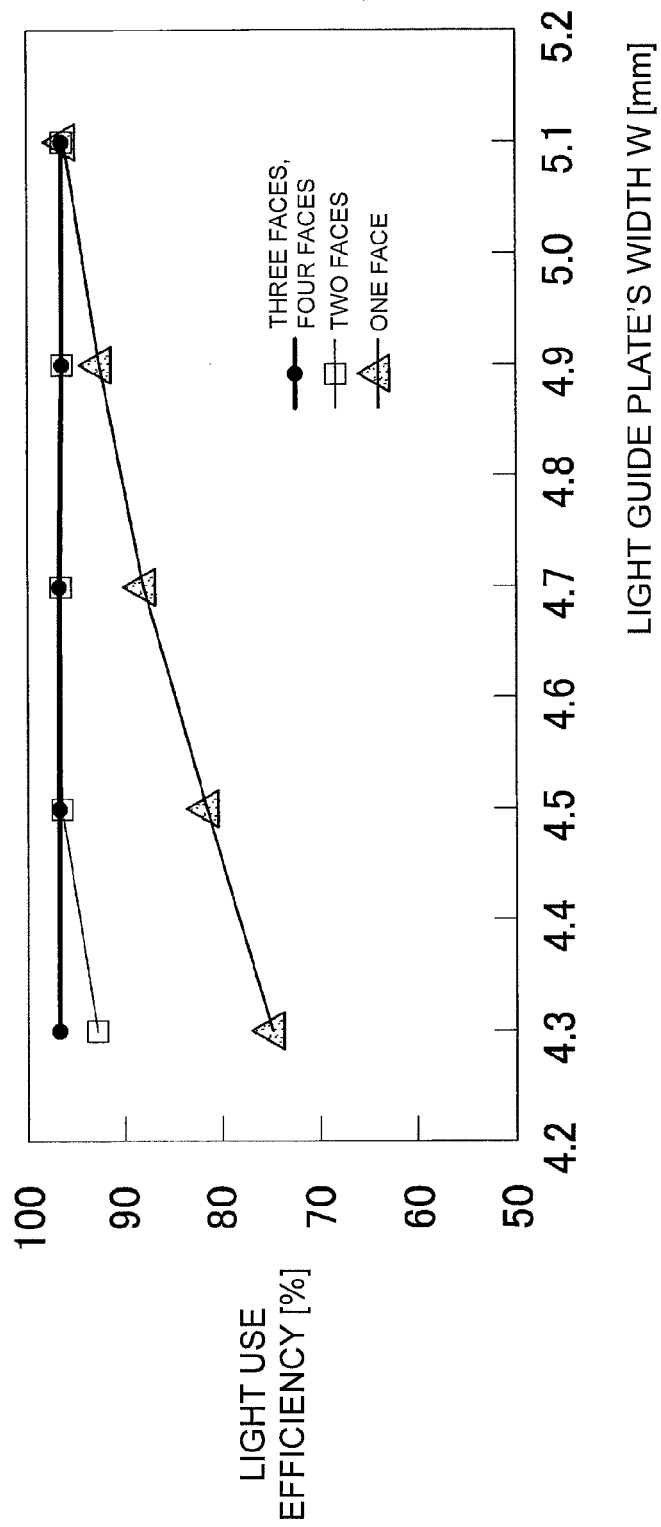
FIG. 9 is a diagram illustrating a result of the relation between the number of faces of a light reflection wall having different inclination angles and light use efficiency by simulation.
Figure 10A:
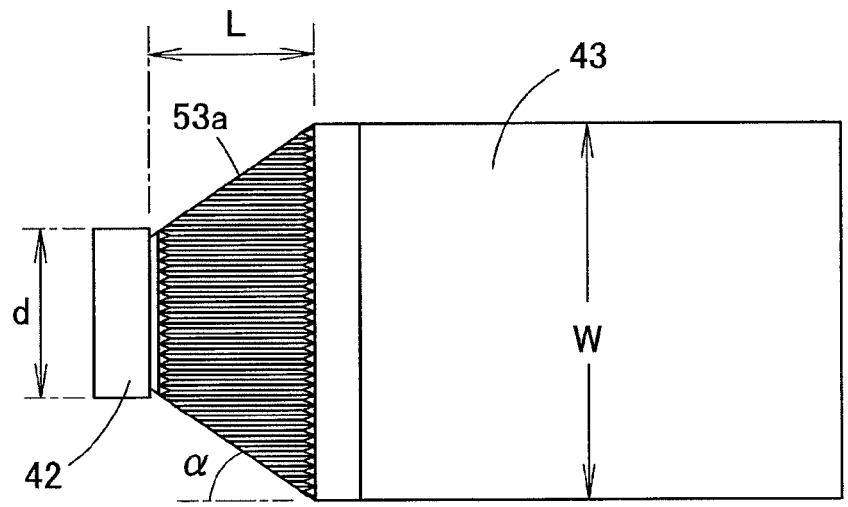
FIG. 10A is a schematic plan view illustrating a sample in which the number of faces in the light reflection wall is one.
Figure 10B:
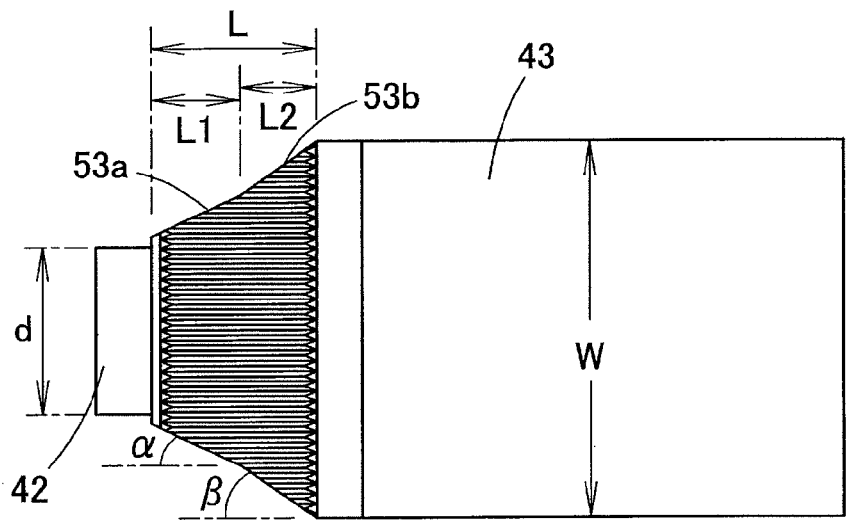
FIG. 10B is a schematic plan view illustrating a sample in which the number of faces of the light reflection wall is two.
Figure 11A:
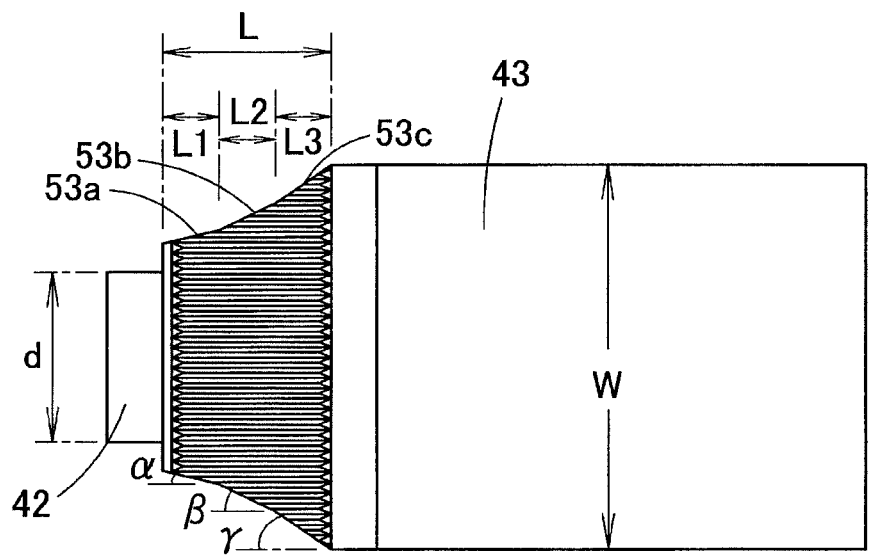
FIG. 11A is a schematic plan view illustrating a sample in which the number of faces in the light reflection wall is three.
Figure 11B:
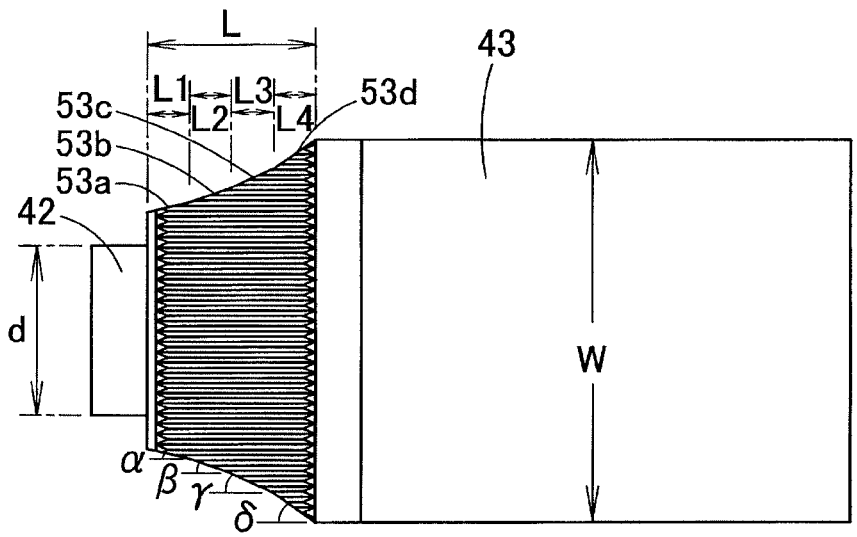
FIG. 11B is a schematic plan view illustrating a sample in which the number of faces of the light reflection wall is four.

FIG. 9 illustrates a result of obtaining the relation between the number of faces of a light reflection wall having different inclination angles and light use efficiency by simulation. For the simulation, four kinds of samples in which the number of faces of the light reflection wall (the number of flat faces constructing the light reflection wall 53) is 1, 2, 3, and 4 were used. The sample whose number of faces is one has one optical reflection wall 53a whose inclination angle α is 45°, and the length L of the light reflection wall 53a is 1.55 mm as illustrated in FIG. 10A. The sample whose number of faces is two has, as illustrated in FIG. 10B, two optical reflection walls 53a and 53b whose inclination angles are α=30° and β=45°, and the lengths L1 and L2 of the light reflection walls 53a and 53b are almost equal to each other and the total (L=L1+L2) is 1.55 mm. The sample whose number of faces is three has, as illustrated in FIG. 11A, three optical reflection walls 53a, 53b, and 53c whose inclination angles are α=15°, β=30°, and γ=45°. In this case as well, the lengths L1, L2, and L3 of the light reflection walls 53a, 53b, and 53c are almost equal to each other and the total (L=L1+L2+L3) is 1.55 mm. The sample whose number of faces is four has, as illustrated in FIG. 11B, four optical reflection walls 53a, 53b, ... 53c, and 53d whose inclination angles are α=15°, β=25°, γ=35°, and δ=45°. In this case as well, the lengths L1, L2, L3, and L4 of the light reflection walls 53a, 53b, ... 53c, and 53d are almost equal to each other and the total (L=L1+L2+L3+L4) is 1.55 mm. In all of the samples, the width "d" of the light exit window of the light source 42 is 2.0 mm. In each of the samples, while changing the width W of the light guide plate like 4.3 mm, 4.5 mm, 4.7 mm, 4.9 mm, and 5.1 mm, the light use efficiency was obtained.

According to FIG. 9, in the sample (conventional technique) whose number of faces of the light reflection wall is one, when the width W of the light guide plate is narrow, the light use efficiency sharply drops. In the sample whose number of faces is one, when the width W of the light guide plate decreases, the width of the light incident end face 49 immediately becomes smaller than the width "d" of the light source 42. On the other hand, in the samples whose number of faces of the light reflection wall is two or larger, it is understood that even when the light guide plate becomes narrow, drop in the light use efficiency is smaller as compared with that in the conventional technique (a curve indicating changes in the light use efficiency in the case where the number of faces of the light reflection wall is three and a curve indicating changes in the light use efficiency in the case where the number of faces of the light reflection wall is four overlap with each other). In particular, the larger the number of faces of the light reflection wall is, the smaller the decrease in the light use efficiency is. In the range of the values of the width W in FIG. 9, in the samples whose number of faces is three or larger, decrease in the light use efficiency is hardly seen.

Figure 12A:
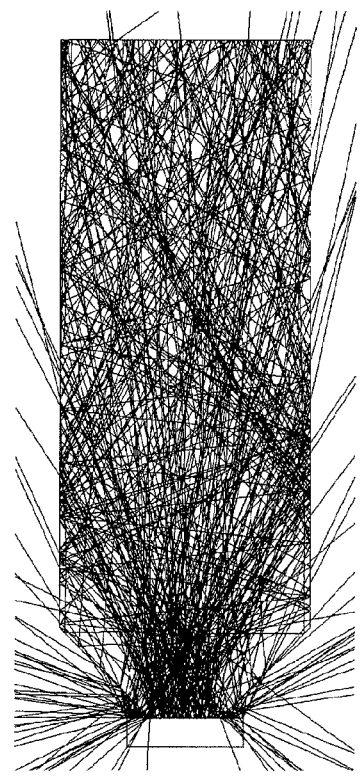
FIG. 12A is a light ray diagram illustrating travel trajectories of light emitted from a light source obtained by simulation in the case where the number of faces of a light reflection wall is one.
Figure 12B:
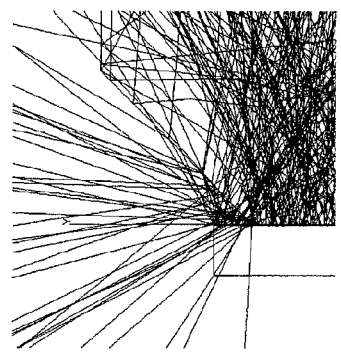
FIG. 12B is an enlarged diagram of a part of the light reflection wall of FIG. 12A.
Figure 12C:
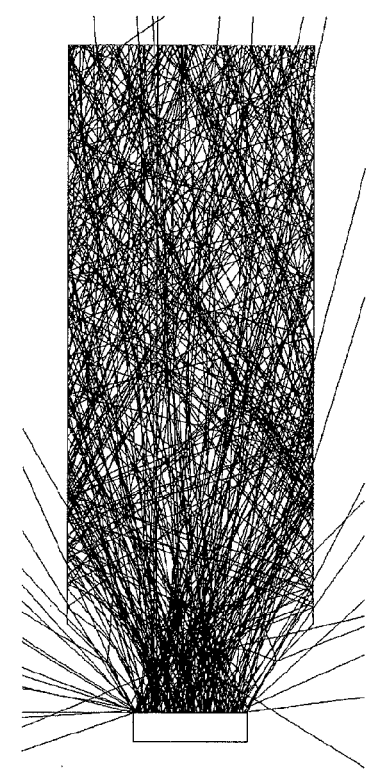
FIG. 12C is a light ray diagram illustrating travel trajectories of light emitted from a light source obtained by simulation in the case where the number of faces of a light reflection wall is two.
Figure 12D:
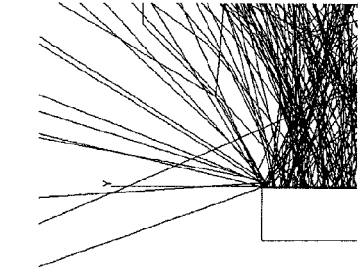
FIG. 12D is an enlarged diagram of a part of the light reflection wall of FIG. 12C.
Figure 13A:
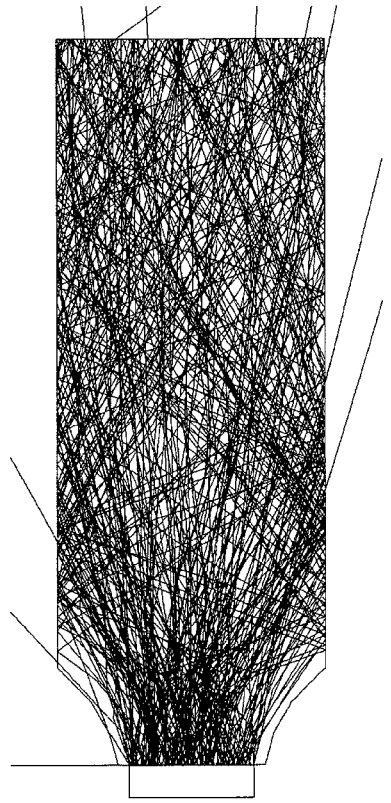
FIG. 13A is a light ray diagram illustrating travel trajectories of light emitted from a light source obtained by simulation in the case where the number of faces of a light reflection wall is three.
Figure 13B:
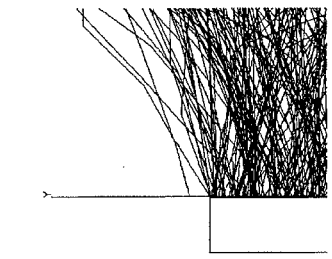
FIG. 13B is an enlarged diagram of a part of the light reflection wall of FIG. 13A.
Figure 13C:
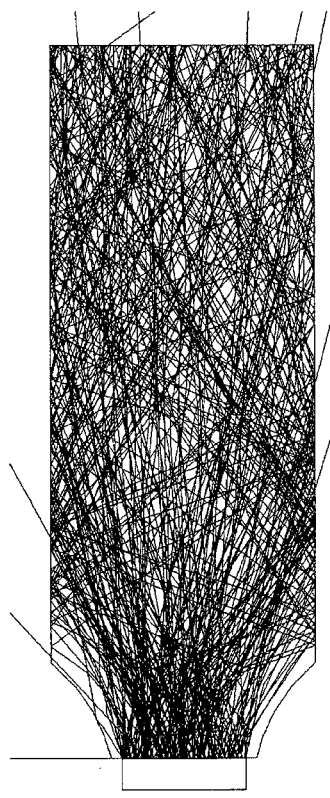
FIG. 13C is a light ray diagram illustrating travel trajectories of light emitted from a light source obtained by simulation in the case where the number of faces of a light reflection wall is four.
Figure 13D:
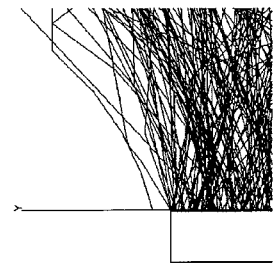
FIG. 13D is an enlarged diagram of a part of the light reflection wall of FIG. 13C.

FIG. 12A is a light ray diagram illustrating travel trajectories of light emitted from a light source obtained by simulation in the case where the number of faces of a light reflection wall is one. FIG. 12B is an enlarged diagram of a part of the light reflection wall 53 of FIG. 12A. FIG. 12C is a light ray diagram illustrating travel trajectories of light emitted from a light source obtained by simulation in the case where the number of faces of a light reflection wall is two. FIG. 12D is an enlarged diagram of a part of the light reflection wall 53 of FIG. 12C. FIG. 13A is a light ray diagram illustrating travel trajectories of light emitted from a light source obtained by simulation in the case where the number of faces of the light reflection wall is three. FIG. 13B is an enlarged diagram of a part of the light reflection wall 53 of FIG. 13A. FIG. 13C is a light ray diagram illustrating travel trajectories of light emitted from a light source obtained by simulation in the case where the number of faces of a light reflection wall is four. FIG. 13D is an enlarged diagram of a part of the light reflection wall 53 of FIG. 13C. It is understood also from FIGS. 12A to 12D and FIGS. 13A to 13D, as the number of faces of the light reflection wall 53 is larger, the light emitted from the light source can be made enter the light guide plate efficiently, and the leakage from the light guide plate is small.

Second Embodiment

Figure 14A:
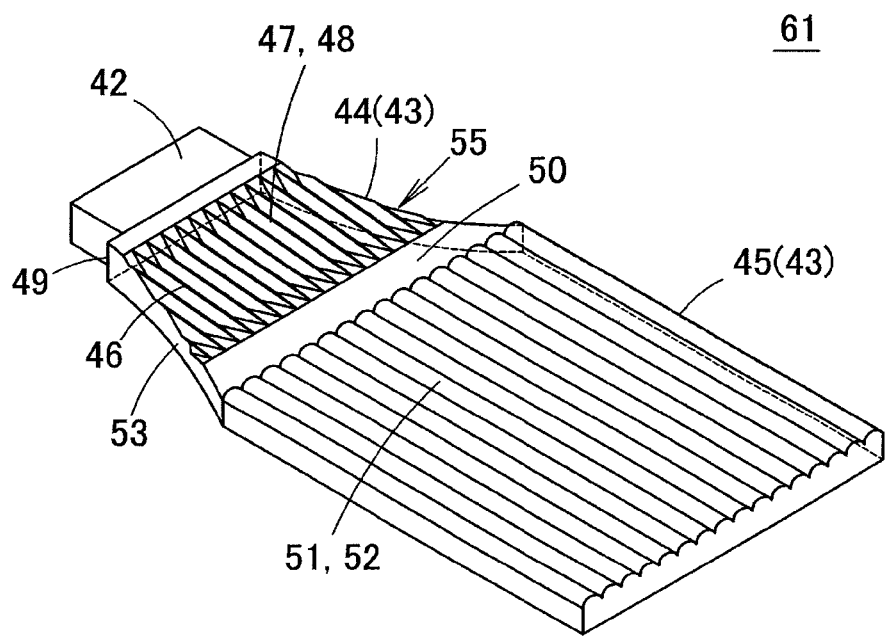
FIG. 14A is a perspective view illustrating a surface light source device according to a second embodiment of the present invention.
Figure 14B:
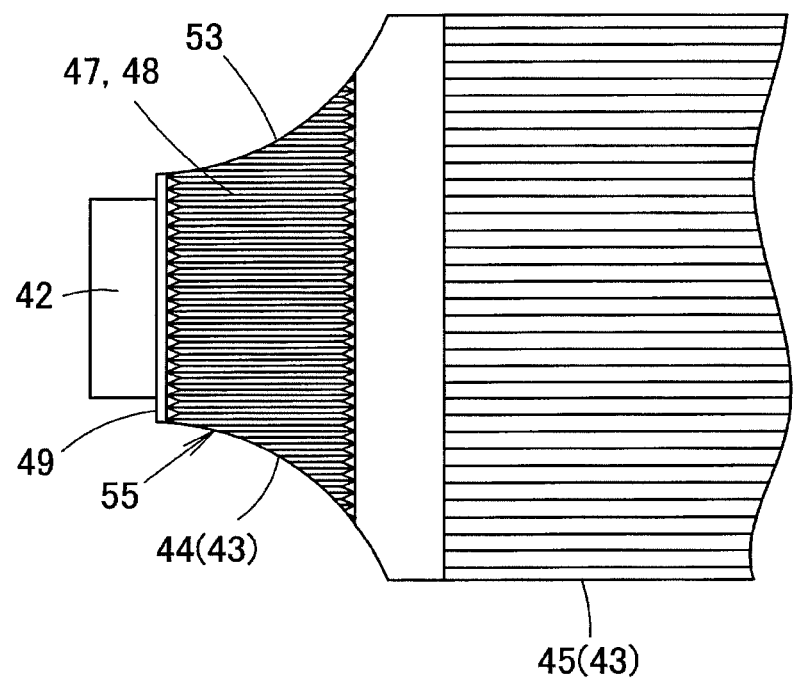
FIG. 14B is a partly-broken plan view of the surface light source device illustrated in FIG. 14A.

FIG. 14Å is a perspective view illustrating a surface light source device 61 according to a second embodiment of the present invention. FIG. 14B is a partly-broken plan view of the surface light source device 61. In the surface light source device 61 of the second embodiment, the light reflection wall 53 of the light guide plate 43 is a curved face, for example, a circular-arc face. In particular, the light reflection wall 53 is a recessed curved face which is recessed to the inside of the light guide plate 43. When the light reflection wall 53 is viewed from above, the angle (inclination angle) formed between the end on the light incident end face side (tangent line at the end on the light incident end face side) and the optical axis direction is smaller than the angle (inclination angle) formed by the end on the side far from the light incident end face 49 (tangent line at the end on the side far from the light incident end face 49) and the light axis direction. Since the other points are similar to those of the first embodiment, the same reference numerals are designated to the same components and their description will not be repeated (also in the following embodiments).

Also in the second embodiment, in a manner similar to the first embodiment, light leakage in the side faces of the light guide plate is reduced, the light capture rate of the light source 42 by the light incident end face 49 is improved, and the light use efficiency of the surface light source device 61 can be improved.

Third Embodiment

Figures 15A, 15B:
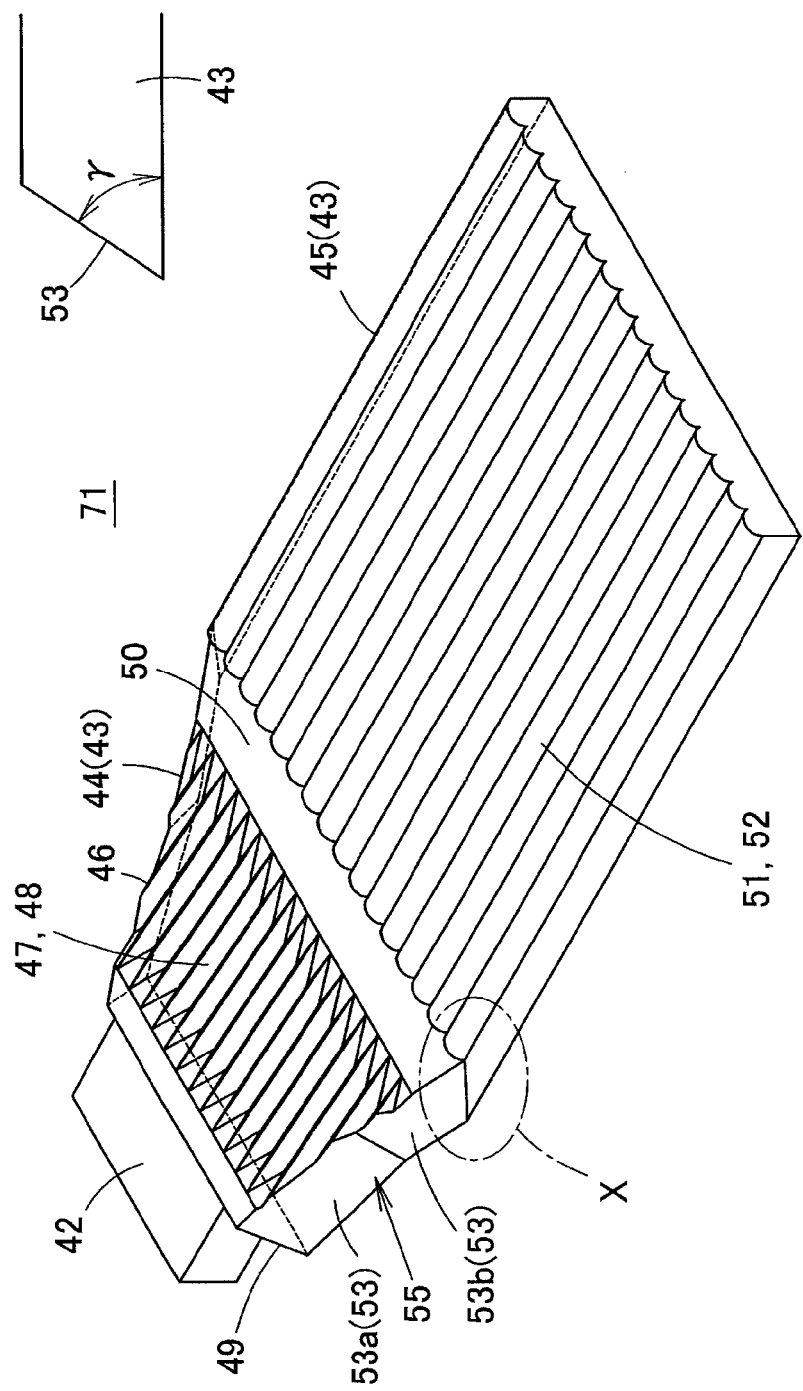
FIG. 15A is a perspective view illustrating a surface light source device according to a third embodiment of the present invention.
FIG. 15B is an enlarged cross section of an X part of FIG. 15A.

FIG. 15A is a perspective view illustrating a surface light source device 71 according to a third embodiment of the present invention. FIG. 15B is an enlarged view illustrating a cross section parallel to the light incident end face 49 in a part X of FIG. 15A. In the first embodiment, the normal set in the light reflection wall 53 is parallel to the light emitting surface 51. In the surface light source device 71 of the third embodiment, the normal set to the light reflection wall 53 is inclined from the direction parallel to the light emitting surface 51. That is, in the surface light source device 71, in a light guide plate section parallel to the light incident end face 49, the angle γ formed between the light reflection wall 53 and the under face of the light guide plate 43 is smaller than 90°. The angle γ is, for example, 60° or greater and 75° or less.

Figures 16A, 16B:
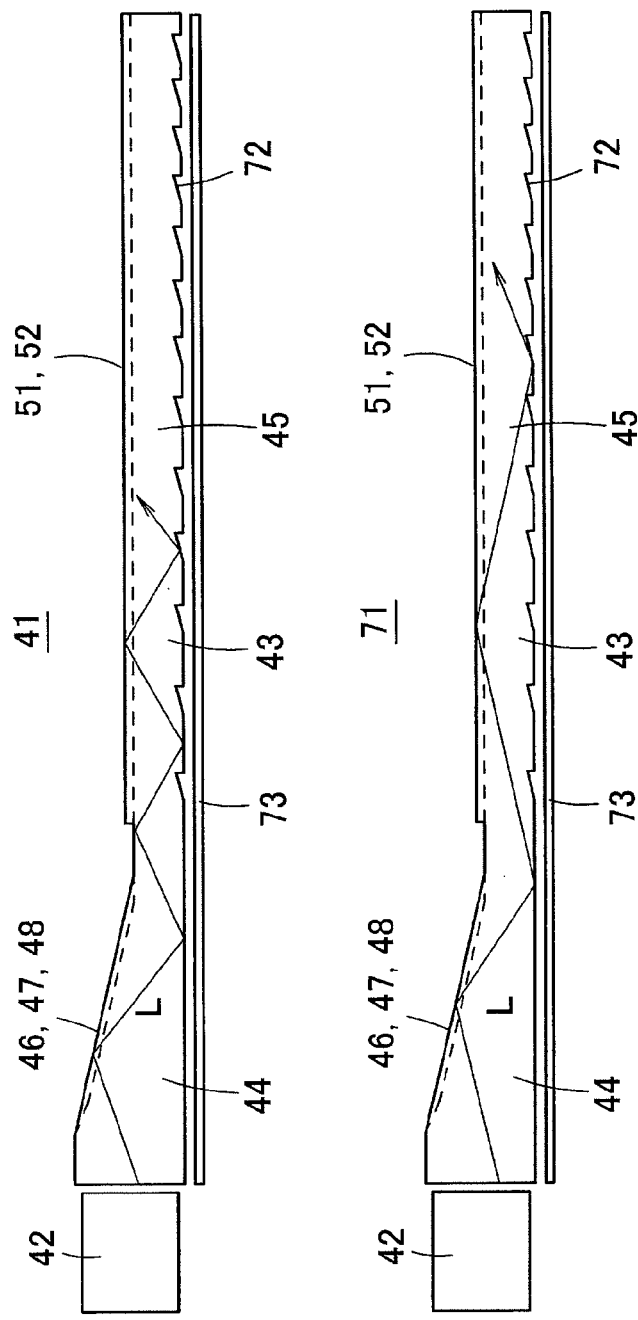
FIG. 16A is a schematic view for explaining the behavior of light in the case where the light reflection wall is a perpendicular face.
FIG. 16B is a schematic view for explaining the behavior of light in the case where the light reflection wall is an inclined face.

Light guided in the light introduction part 44 is reflected by the inclined face 46, so that the directivity characteristic in a face perpendicular to the light emitting surface 51 becomes wider. Consequently, as illustrated in FIG. 16A, the incidence angle of light reflected by the inclined face 46 at the time of incidence on the upper or lower face of the light guide plate body 45 becomes small, and the light easily leaks from the light guide plate body 45 without being reflected by the light exit means 72. On the other hand, when the light reflection wall 53 is inclined like in the surface light source device 71, the directivity characteristic in a plane perpendicular to the light emitting surface 51, of light which is totally reflected by the light reflection wall 53 becomes narrow. Consequently, as illustrated in FIG. 16B, the incidence angle of light reflected by the light reflection wall 53 at the time of incidence on the upper or lower face of the light guide plate body 45 becomes large, and leakage of light in the light guide plate body 45 decreases.

Fourth Embodiment

Figure 17:
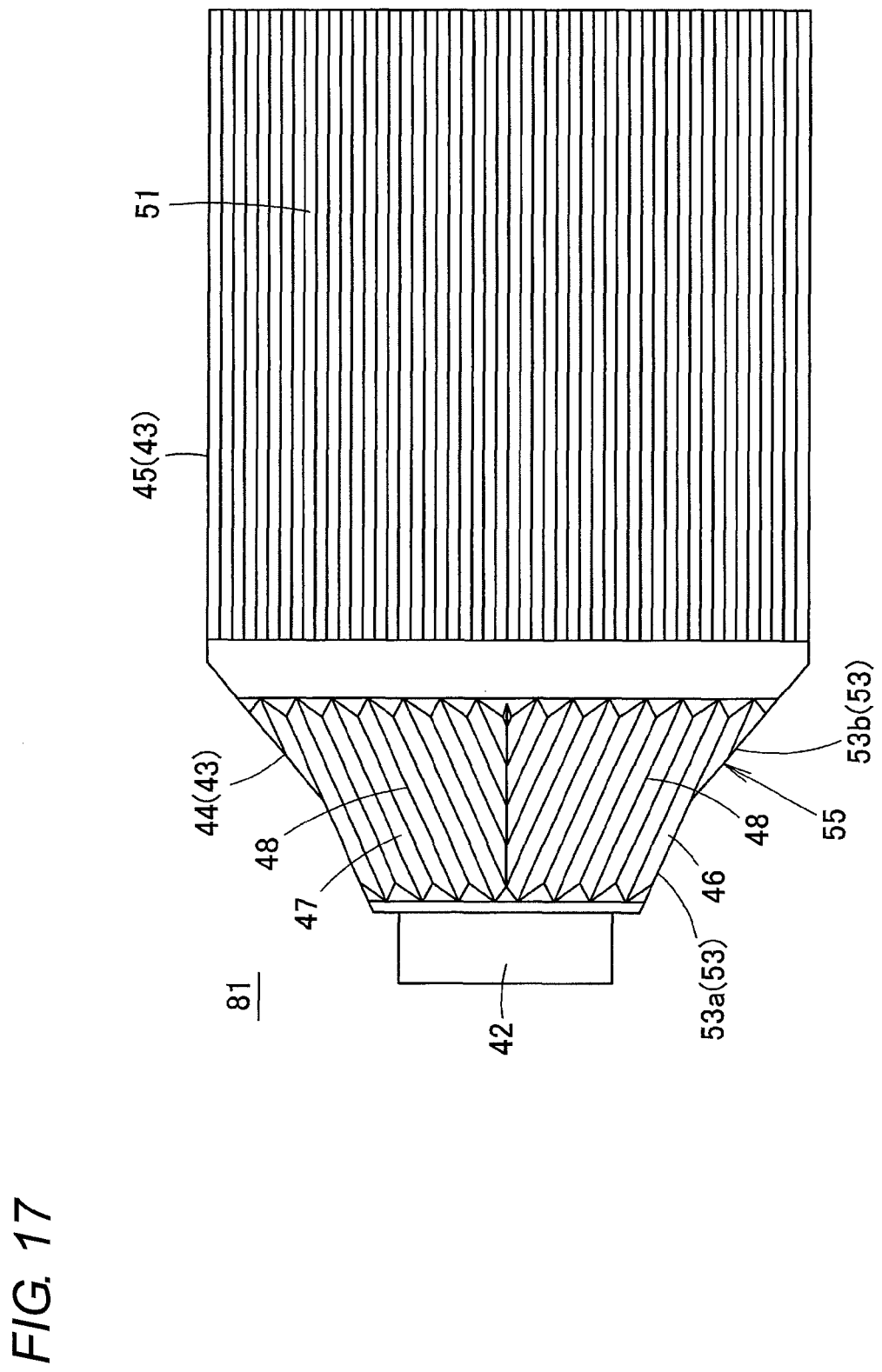
FIG. 17 is a plan view illustrating a surface light source device according to a fourth embodiment of the present invention.

FIG. 17 is a plan view illustrating a surface light source device 81 according to a fourth embodiment of the present invention. The pattern elements 48 in the surface light source device 81 in right and left regions with respect to the optical axis passing through the center of the light source 42 are inclined to directions opposite to each other. In each of the right and left regions, the pattern elements 48 are arranged in parallel.

Fifth Embodiment

Figure 18:
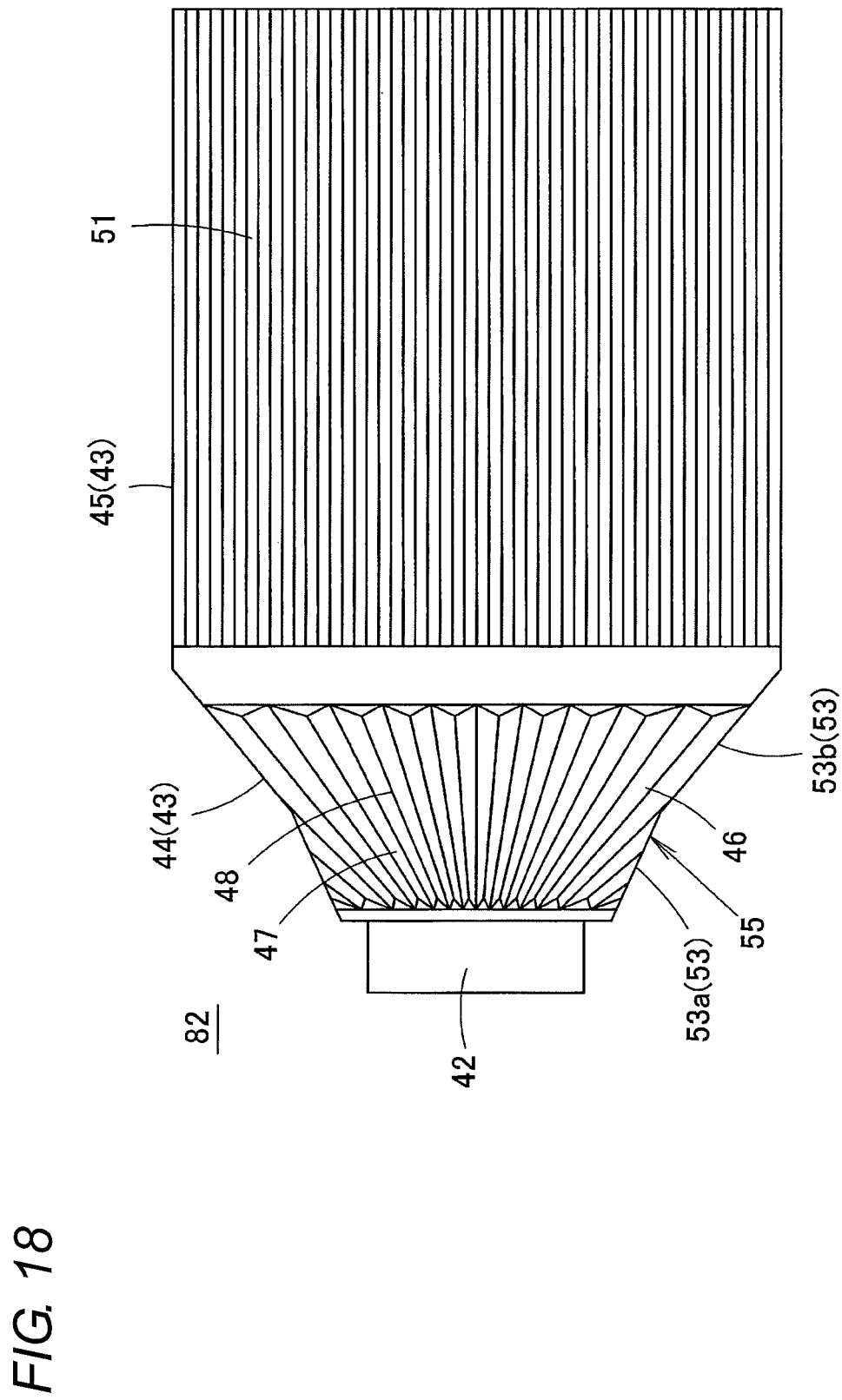
FIG. 18 is a plan view illustrating a surface light source device according to a fifth embodiment of the present invention.

FIG. 18 is a plan view illustrating a surface light source device 82 according to a fifth embodiment of the present invention. When viewed from above, the pattern elements 48 of the surface light source device 82 are arranged radially using the light emission center of the light source 42 or its proximity as center.

Figure 19A:
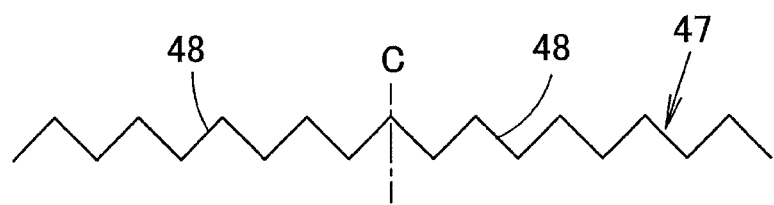
FIGS. 19A, 19B, and 19C are schematic diagrams illustrating various sectional shapes of a directivity conversion pattern.
Figure 19B:
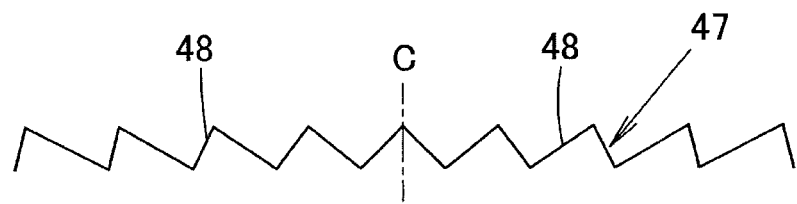
Figure 19C:
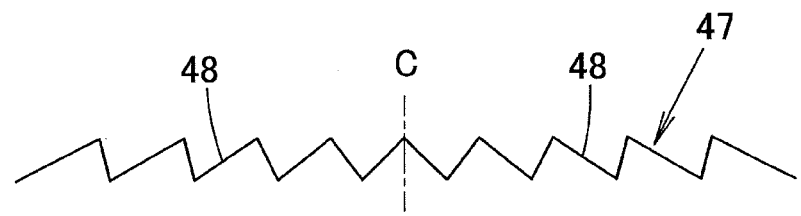

The directivity conversion pattern 47 of the first to fifth embodiments may be constructed by the pattern elements 48 having a bilaterally symmetrical sectional shape as illustrated in FIG. 19A. As illustrated in FIGS. 19B and 19C, the directivity conversion pattern 47 may be constructed by the pattern elements 48 having a bilaterally asymmetrical sectional shape. In the directivity conversion pattern 47 of FIG. 19B, the inclination angle of a slant face close to the center plane C (plane passing through the light source center and perpendicular to the light incident end face 49 and the light emitting surface 51) out of two slant faces of the pattern element 48 whose section has a V groove shape is larger than that of the slant face far from the center plane C. In the directivity conversion pattern 47 of FIG. 19C, the inclination angle of a slant face close to the center plane C out of two slant faces of the pattern element 48 whose section has a V groove shape is smaller than that of the slant face far from the center plane C. Further, the sectional shapes of the pattern elements 48 illustrated in FIGS. 19B and 19C gradually change as the pattern elements is far from the center plane C and, moreover, the pattern elements 48 have sections symmetrical with respect to the center plane C.

In the first to fifth embodiments, the inclined face 46 is formed on the top face of the light introduction part 44, and the directivity conversion pattern 47 is also formed on the top face of the light introduction part 44. The inclined face 46 may be provided on the under face of the light introduction part 44, and the directivity conversion pattern 47 may be also provided on the under face of the light guide plate 43.

Sixth Embodiment

Figure 20:
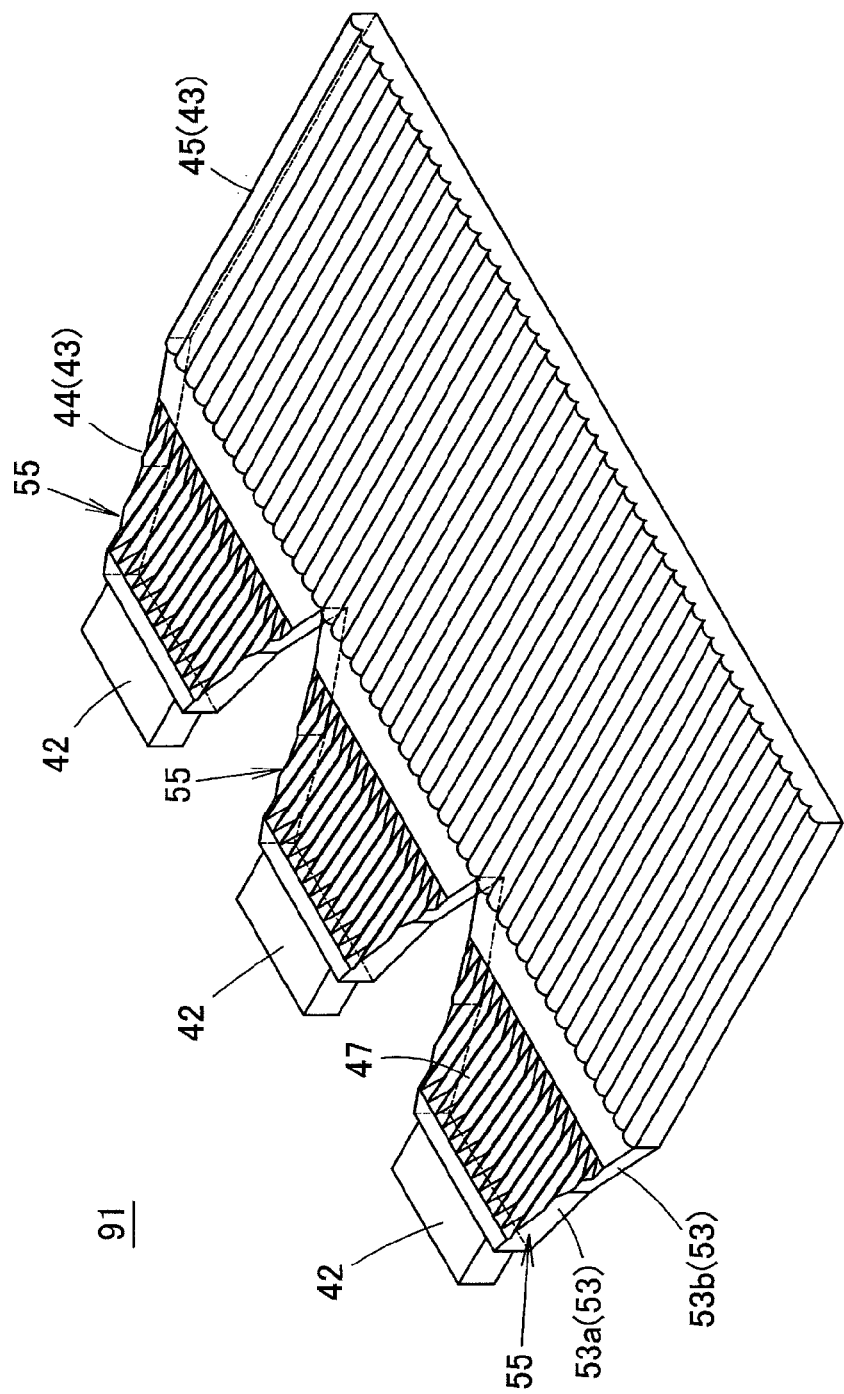
FIG. 20 is a perspective view illustrating a surface light source device according to a sixth embodiment of the present invention.

FIG. 20 is a perspective view illustrating a surface light source device 91 according to a sixth embodiment of the present invention. In the surface light source device 91, a plurality of tapered parts 55 are provided on a single light guide plate 43, and the light source 42 is opposed to the light incident end face 49 of each of the tapered parts 55.

Also in the surface light source device 91, light which goes out from a light source 42 and enters the light introduction part 44 is reflected by the directivity conversion pattern 47 so that the course is bent to the width direction of the light guide plate 43. The light reflected by the reflection wall 53 returns to a forward region of the light source 42 as an emission source. Therefore, light emitted from a light source 42 does not easily enter the forward region of the adjacent light source 42 and occurrence of brightness unevenness on the light emitting surface 51 is suppressed. Further, even the arrangement pitch of the light sources 42 becomes short, the width of the light incident end face 49 is prevented from becoming smaller than the width of the light exit window of the light source 42. Also in the case where the arrangement pitch of the light sources 42 becomes short, drop in the light use efficiency is suppressed.

Seventh Embodiment

Figure 21:
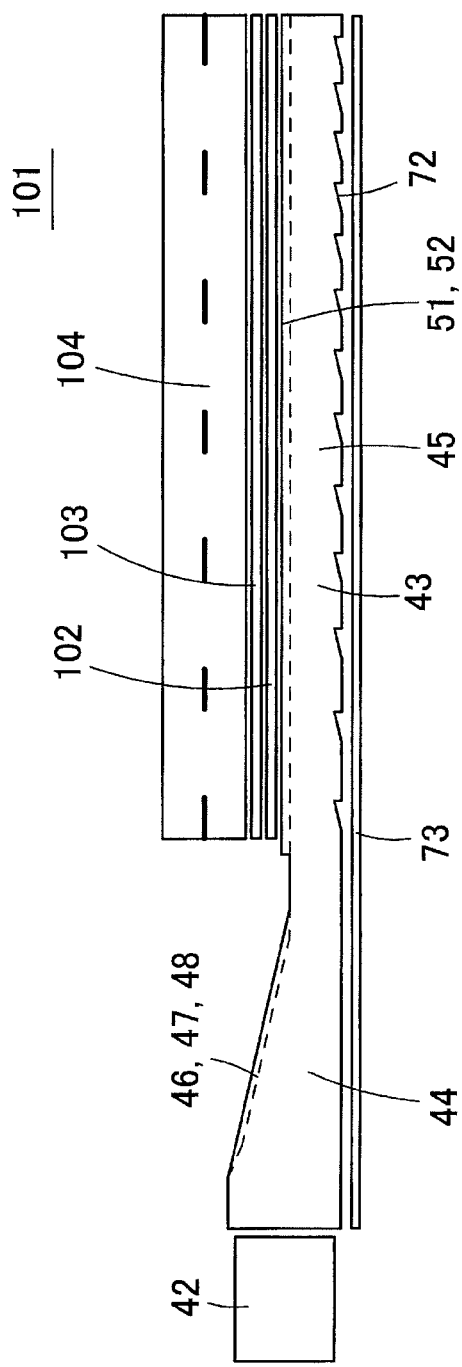
FIG. 21 is a schematic cross section illustrating a liquid crystal display device according to one or more embodiments of the present invention.

FIG. 21 is a schematic cross section illustrating a liquid crystal display device 101 using a surface light source device according to one or more embodiments of the present invention (for example, the surface light source device 41 of the first embodiment). As illustrated in FIG. 21, a diffusion plate 102, one or two prism sheets 103, and a liquid crystal panel 104 are overlaid on the light emitting surface 51 of the light guide plate 43, and the reflection sheet 73 is opposed to the under face of the light guide plate 43. In the liquid crystal display device 101, the characteristic of the surface light source device of one or more embodiments of the present invention can be utilized, the light use efficiency of the liquid crystal display device 101 is improved so that the screen is easily seen, and the thickness of the liquid crystal display device 101 can be reduced.

Eighth Embodiment

Figure 22:
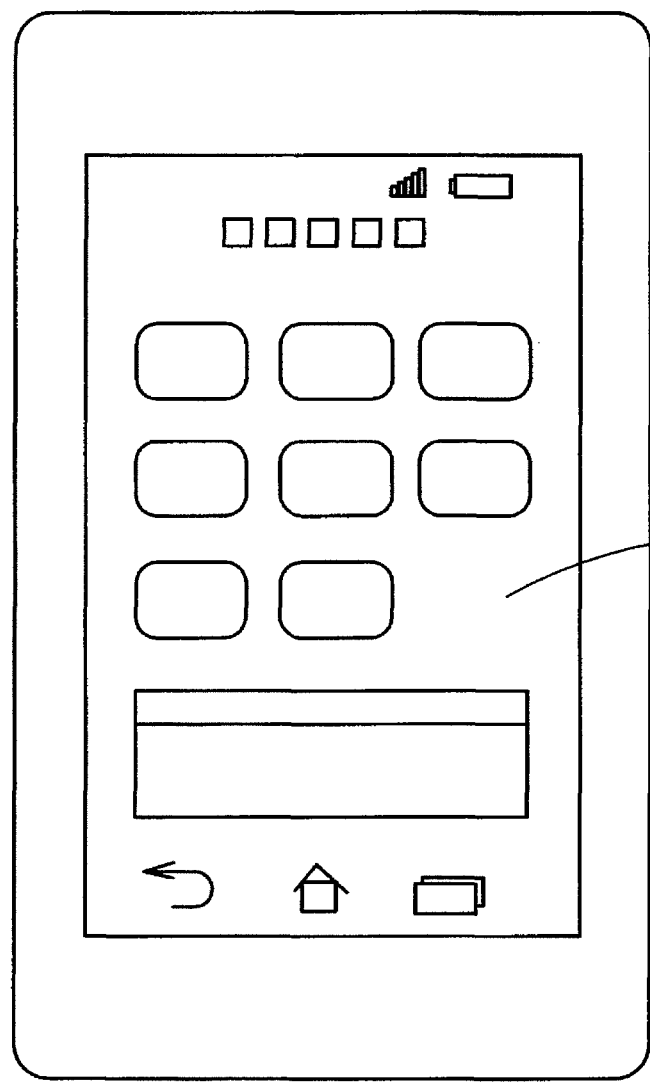
FIG. 22 is a schematic front view illustrating a mobile device according to one or more embodiments of the present invention.

FIG. 22 is a front view of a mobile device using the liquid crystal display device of one or more embodiments of the present invention, that is, a smartphone 111. The smartphone 111 has, in its front face, a liquid crystal display device 112 with a touch panel. When the liquid crystal display device of one or more embodiments of the present invention is used for the smartphone 111, the light use efficiency of the surface light source device improves and the display of the screen becomes brighter. The surface light source device of one or more embodiments of the present invention can be applied to not only a cellular phone such as a smartphone but also a mobile device such as a tablet computer, an electronic dictionary, or an electronic book reader.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A light guide plate comprising:
    a light introduction part comprising an end face configured to have light incident thereon; and
    a light guide plate body provided continuously to the light introduction part and comprising a thickness smaller than maximum thickness of the light introduction part, wherein the light guide plate body comprises a light emitting surface configured to emit light incident from the end face, wherein a directivity conversion pattern is provided on the light introduction part, wherein the directivity conversion pattern converts directivity of the light incident on the end face to spread in a first direction that is a thickness direction of the light introduction part, such that the directivity of the light is inclined with respect to a second direction perpendicular to the end face, wherein a light reflection wall is provided on a side surface of the light introduction part, and wherein the light reflection wall comprises a first portion having a first end thereof intersecting a plane of the light introduction part and a second end thereof opposite the first end, wherein the light reflection wall comprises a second portion that intersects the second end of the first portion, wherein, when viewed from the first direction perpendicular to the light emitting surface, the first portion forms a first angle α with the second direction, and the second portion forms a second angle β with the second direction, and wherein the first angle α is smaller than the second angle β.

2. The light guide plate according to claim 1, wherein, when viewed from the first direction, a width of the light reflection wall at the first end of the first portion is smaller than a width of the light reflection wall where the light reflection wall intersects the light guide plate body.

3. The light guide plate according to claim 1, wherein, when viewed from the first direction, an angle formed by the light reflection wall with the second direction increases as the light reflection wall is farther away from the end face.

4. The light guide plate according to claim 1, wherein the light reflection wall is constructed by a plurality of flat faces.

5. The light guide plate according to claim 1, wherein the light reflection wall is constructed by a curved face.

6. The light guide plate according to claim 1, wherein the light introduction part comprises, on at least one of a face on the light exit side and a face opposite to the face, an inclined face which is inclined from a surface of a part thicker than the light guide plate body toward an end of the light guide plate body.

7. The light guide plat according to claim 1, wherein, when viewed from the first direction, the entire light reflection wall is inclined with respect to the second direction.

8. A surface light source device comprising:
the light guide plate according to claim 1; and
a light source configured to transmit light to the end face of the light guide plate.

9. A liquid crystal display device comprising:
the light conduction plate according to claim 1;
a light source configured to transmit light to the end face of the light guide plate; and
a liquid crystal panel disposed so as to face the light emitting surface of the light guide plate.

10. A mobile device comprising the liquid crystal display device according to claim 9.

11. A light guide plate comprising:
a light introduction part comprising an end face configured to have light incident thereon; and
a light guide plate body provided continuously to the light introduction part and comprising a thickness smaller than maximum thickness of the light introduction part, wherein the light guide plate body comprises a light emitting surface configured to emit light incident from the end face, wherein a directivity conversion pattern is provided on the light introduction part, wherein the directivity conversion pattern converts directivity of the light incident on the end face to spread in a first direction that is a thickness direction of the light introduction part, such that the directivity of the light is inclined with respect to a second direction perpendicular to the end face, wherein a light reflection wall is provided on a side surface of the light introduction part, and wherein the light reflection wall has comprises a portion that, when viewed from the first direction perpendicular to the light emitting surface, is inclined with respect to the second direction, and wherein, when viewed from the second direction, a normal to the light reflection wall is inclined with respect to a third direction that is a width direction of the light introduction part.

12. The light guide plate according to claim 11,
wherein the light reflection wall comprises a first portion having a first end thereof intersecting a plane of the light introduction part and a second end thereof opposite the first end, wherein the light reflection wall comprises a second portion that intersects the second end of the first portion, wherein, when viewing the light reflection wall from the first direction, the first portion forms a first angle α and with the second direction, and the second portion forms a second angle β with the second direction, and wherein the first angle α is smaller than the second angle β.

13. The light guide plate according to claim 11, wherein the light introduction part comprises, on at least one of a face on the light exit side and a face opposite to the face, an inclined face which is inclined from a surface of a part thicker than the light guide plate body toward an end of the light guide plate body.

14. A mobile device comprising:
a liquid crystal display device comprising:
a light source that emits light;
a light guide plate comprising:
a light introduction part comprising an end face opposite the light source that receives light incident from the light source; and
a light guide plate body provided continuously to the light introduction part and comprising a thickness smaller than maximum thickness of the light introduction part,
wherein the light guide plate body comprises a light emitting surface configured to emit light incident from the end face,
wherein a directivity conversion pattern is provided on the light introduction part,
wherein the directivity conversion pattern converts directivity of the light incident on the end face to spread in a first direction that is a thickness direction of the light introduction part, such that the directivity of the light is inclined with respect to a second direction perpendicular to the end face,
wherein a light reflection wall is provided on a side surface of the light introduction part,
wherein the light reflection wall comprises a first portion having a first end thereof intersecting a plane of the light introduction part and a second end thereof opposite the first end, wherein the light reflection wall comprises a second portion that intersects the second end of the first portion, wherein, when viewed from the first direction perpendicular to the light emitting surface, the first portion forms a first angle $\alpha$ with the second direction, and the second portion forms a second angle $\beta$ with the second direction, wherein the first angle $\alpha$ is smaller than the second angle $\beta$, wherein, when viewed from the first direction, a width of the light reflection wall at the first end of the first portion is smaller than a width of the light reflection wall where the light reflection wall intersects the light guide plate body; and a liquid crystal panel disposed so as to face the light emitting surface of the light guide plate.

* * * * *